United States Patent
Qian et al.

(10) Patent No.: US 12,155,510 B2
(45) Date of Patent: Nov. 26, 2024

(54) RADIO FREQUENCY TRANSMITTER

(71) Applicant: HUAWEI TECHNOLOGIES CO., LTD., Shenzhen (CN)

(72) Inventors: Huizhen Qian, Chengdu (CN); Xun Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 17/826,627

(22) Filed: May 27, 2022

(65) Prior Publication Data

US 2022/0286333 A1 Sep. 8, 2022

Related U.S. Application Data

(63) Continuation of application No. PCT/CN2019/122186, filed on Nov. 29, 2019.

(51) Int. Cl.
*H04L 27/00* (2006.01)
*H04B 1/04* (2006.01)
*H04L 27/20* (2006.01)

(52) U.S. Cl.
CPC ....... *H04L 27/0002* (2013.01); *H04B 1/0483* (2013.01); *H04L 27/20* (2013.01)

(58) Field of Classification Search
CPC ... H04L 27/0002; H04L 27/20; H04B 1/0483; H04B 1/04
See application file for complete search history.

(56) References Cited

U.S. PATENT DOCUMENTS

2005/0266821 A1 12/2005 Dornbusch
2017/0317697 A1 11/2017 Motoi

FOREIGN PATENT DOCUMENTS

| CN | 108206678 A | 6/2018 |
|---|---|---|
| CN | 108900167 A | 11/2018 |
| CN | 110233635 A | 9/2019 |
| EP | 2999116 A1 | 3/2016 |
| WO | 2016053376 A1 | 4/2016 |

OTHER PUBLICATIONS

Li et al. (CN 110492890 A), A current type radio transmitting front end circuit, signal processing method and transmission system, Nov. 2019, abstract and pp. 1-8 (Year: 2019).*
S. Ali, et al., "A 28GHz 41%-PAE linear CMOS power amplifier using a transformer-based AM-PM distortion-correction technique for 5G phased arrays," in IEEE Isscc Dig. Tech. Papers, pp. 406-407; Feb. 2018.

(Continued)

*Primary Examiner* — Keith Ferguson
(74) *Attorney, Agent, or Firm* — Rimon PC

(57) ABSTRACT

A radio frequency transmitter is provided. The radio frequency transmitter includes a radio frequency front-end and a control circuit. The radio frequency front-end includes a current source set, a compensation circuit, and a matching network. The compensation circuit may compensate for a difference of load impedance between N current source subsets in the current source set. Therefore, an impedance mismatch of the current source set may be alleviated, and a power loss of the current source set may be avoided. This helps improve the efficiency of the radio frequency transmitter.

12 Claims, 15 Drawing Sheets

(56) References Cited

OTHER PUBLICATIONS

S. Shopov, et al., "Ultra-broadband I/Q RF-DAC transmitters," IEEE Trans. Microw. Theory Techn., vol. 65, No. 12, pp. 5411-5421; Dec. 2017.
A. Agah, et al., "A 42 to 47-GHz, 8-bit I/Q digital-to-RF converter with 21-dBm Psat and 16% PAE in 45-nm SOI CMOS," in Proc. of IEEE RFIC, pp. 249-252; Jun. 2013.
T. Li, et al., "A continuous-mode harmonically tuned 19-to-29.5GHz ultra-linear PA supporting 18Gb/s at 18.4% modulation PAE and 43.5% peak PAE," in IEEE ISSCC Dig. Tech. Papers, pp. 410-411; Feb. 2018.

* cited by examiner

RADIO FREQUENCY TRANSMITTER

CROSS-REFERENCE TO RELATED APPLICATIONS

This application is a continuation of International Application No. PCT/CN2019/122186, filed on Nov. 29, 2019, the disclosure of which is hereby incorporated by reference in its entirety.

TECHNICAL FIELD

This application relates to the field of wireless communication technologies, and in particular, to a radio frequency transmitter.

BACKGROUND

A radio frequency transmitter is a common communication element, and may be configured to transmit a radio frequency (RF) output signal. The RF output signal is mostly generated by a radio frequency front-end of the radio frequency transmitter.

Currently, more radio frequency front-ends are integrated with current source sets. A radio frequency transmitter may control its current source set, generate a set output signal, and obtain an RF output signal based on the set output signal.

However, because the circuit structure of the current source set is complex, in a case in which the radio frequency transmitter outputs an output signal of a millimeter wave band, a parasitic effect in a current source array becomes prominent. Consequently, the efficiency of the current source array is low, and the performance improvement of the radio frequency transmitter is limited. Therefore, the efficiency of the radio frequency transmitter currently needs to be further improved.

SUMMARY

In view of this, embodiments of this application provide a radio frequency transmitter A compensation circuit is disposed in the radio frequency transmitter, to improve the efficiency of the radio frequency transmitter.

According to a first aspect, an embodiment of this application provides a radio frequency transmitter that includes a radio frequency front-end and a control circuit. The radio frequency front-end includes a current source set, a compensation circuit, and a matching network. The current source set includes N current source subsets, where N is an integer greater than 1. The current source subset includes at least one current source unit, and the output ends of the N current source subsets are connected in parallel by using an output signal cable. A first end of the output signal cable is connected to the matching network, and a second end of the output signal cable is connected to the compensation circuit. The compensation circuit may compensate for the difference of load impedance between the N current source subsets. The control circuit may output a plurality of control signals, where the plurality of control signals is in a one-to-one correspondence with a plurality of current source units in the current source set. The current source units in the current source set may output unit output signals under the control of the corresponding control signals, and set output signals of the current source set include the unit output signals of the current source units. The matching network may perform impedance matching on the set output signals of the current source set.

Because the structure of the current source set is complex, in a case in which the radio frequency transmitter works in a millimeter wave band, a prominent parasitic effect will appear in the current source set. The parasitic effect may also be understood as that a parasitic capacitor and a parasitic inductor exist between the N current source subsets of the current source set, and therefore the load impedances of different current source subsets are different. In other words, an impedance mismatch occurs in the current source set. Therefore, the power loss of the current source set is increased, and the efficiency of the radio frequency transmitter is reduced. In some embodiments of this application, the compensation circuit is disposed in the radio frequency front-end, and the compensation circuit compensates for the difference of load impedance among the N current source subsets, so that the impedance mismatch in the current source set may be improved. This helps improve the efficiency of the radio frequency transmitter.

For example, the compensation circuit in some embodiments of this application may include a first compensation inductor and a first compensation capacitor. One end of the first compensation inductor is connected to the first end of the output signal cable, the other end of the first compensation inductor is connected to one end of the first compensation capacitor, and the other end of the first compensation capacitor is grounded. The first compensation inductor and the first compensation capacitor may form an LC resonant circuit, so that two transmission zeros fz1 and fz2 are added to a load impedance curve of each current source subset. Between the two transmission zeros fz1 and fz2, the load impedance of each current source subset increases as an operating frequency increases. After reaching a maximum value, the load impedance of each current source subset decreases as the operating frequency increases. An inductance value of the first compensation inductor and a capacitance value of the first compensation capacitor are properly configured, so that the maximum value of the load impedance of each current source subset is adjusted to be close to a value of optimal load impedance Zopt between the two transmission zeros fz1 and fz2. Therefore, in this embodiment of this application, the load impedance of each current source subset can be close to the same load impedance. This helps reduce the difference of load impedance among the current source subsets, and improve the efficiency of the radio frequency transmitter. In addition, because the load impedance of each current source subset after compensation is close to the same load impedance, namely, the optimal load impedance Zopt, the embodiment of this application further helps increase the output power of the radio frequency transmitter.

In a possible implementation, the first compensation inductor is an inductor with an adjustable or non-adjustable inductance value, and/or the first compensation capacitor is a capacitor with an adjustable or non-adjustable capacitance value. In a case in which at least one of the first compensation inductor and the first compensation capacitor is an adjustable element (an adjustable inductor or an adjustable capacitor), values of the two transmission zeros fz1 and fz2 may be flexibly adjusted by adjusting a value of the adjustable element. This helps flexibly adjust an operating bandwidth of the radio frequency transmitter.

In a possible implementation, the radio frequency transmitter may include two current source sets. One end of the compensation circuit is connected to a second end of an output signal cable of one of the current source sets, and the other end of the compensation circuit is connected to a second end of an output signal cable of the other current source set.

For example, the foregoing two current source sets are a positive-phase current source set and a negative-phase current source set. The positive-phase current source set includes a plurality of positive-phase current source units, and the negative-phase current source set includes a plurality of negative-phase current source units. The control circuit is configured to output a plurality of digital sub-signals, positive-phase drive signals, and negative-phase drive signals. The plurality of digital sub-signals is respectively in a one-to-one correspondence with the plurality of positive-phase current source units and the plurality of negative-phase current source units. The plurality of positive-phase current source units is configured to output positive-phase units output signals under the control of the corresponding positive-phase drive signals and corresponding digital sub-signals. The plurality of negative-phase current source units is configured to output unit output signals under the control of the corresponding negative-phase drive signals and corresponding digital sub-signals. The matching network is configured to perform impedance matching on a set output signal of the positive-phase current source set and a set output signal of the negative-phase current source set.

For example, the compensation circuit may include a second compensation inductor, a second compensation capacitor, and a third compensation inductor. The second compensation inductor, the second compensation capacitor, and the third compensation inductor are sequentially connected in series. In a case in which two current source sets exist, the compensation circuit may be connected in series between the two current source sets. In addition, in a case in which an electric potential 0 point exists between the two ends of the second compensation capacitor. The existence of the electric potential 0 point may be equivalent to a virtual ground. Therefore, the compensation circuit may be equivalent to two LC resonant circuits, and may separately compensate for the difference of load impedance between the current source subsets in the two current source sets.

In a possible implementation, the second compensation inductor is an inductor with an adjustable or non-adjustable inductance value, the second compensation capacitor is a capacitor with an adjustable or non-adjustable capacitance value, and/or the third compensation inductor is an inductor with an adjustable or non-adjustable inductance value. This implementation is used to increase the operating bandwidth of the radio frequency transmitter. Specific analysis is not described again.

In a possible implementation, in the current source set, any current source unit includes a first drive tube and a second drive tube. The first drive tube and the second drive tube form a cascade circuit. The control signal includes a digital sub-signal and a drive signal. A gate of the first drive tube is configured to receive a digital sub-signal corresponding to the current source unit. A drain of the first drive tube is configured to output a unit output signal of the current source unit. A gate of the second drive tube is configured to receive a drive signal corresponding to the current source unit, and a source of the second drive tube is grounded.

In a possible implementation, the control circuit includes an encoder, a radio frequency signal source, and a drive circuit. The control signal includes the digital sub-signal and the drive signal. The encoder may separately provide a plurality of digital sub-signals for the drive circuit and the current source set. The radio frequency signal source may provide a radio frequency input signal for the drive circuit. The drive circuit may generate a plurality of drive signals based on the radio frequency input signal and the plurality of digital sub-signals.

It should be understood that the radio frequency transmitter provided in embodiments of this application has a plurality of possible types. For example, the radio frequency transmitter may be a digital orthogonal transmitter or a digital polarized transmitter. Different types of radio frequency transmitters have different control circuits.

For example, the radio frequency transmitter provided in some embodiments of this application is the digital orthogonal transmitter. The encoder may receive an orthogonal baseband signal, and convert the orthogonal baseband signal into the plurality of digital sub-signals. The radio frequency signal source may generate an orthogonal radio frequency signal $CK_1$ and an orthogonal radio frequency signal $CK_Q$. The drive circuit may convert the plurality of digital sub-signals, the orthogonal radio frequency signal $CK_1$, and the orthogonal radio frequency signal $CK_Q$ into the plurality of drive signals.

Specifically, the plurality of current source units in the current source set includes a plurality of first current source units and a plurality of second current source units, and the plurality of first current source units is in a one-to-one correspondence with the plurality of second current source units. A unit output signal of the first current source unit and a unit output signal of the second current source unit corresponding to the first current source are orthogonal signals to each other.

For another example, the radio frequency transmitter provided in some embodiments of this application is the digital polarized transmitter. The encoder may receive a baseband amplitude signal, and convert the baseband amplitude signal into the plurality of digital sub-signals. The radio frequency signal source may generate a phase modulation signal. The drive circuit may convert the plurality of digital sub-signals and the phase modulation signal into the plurality of drive signals.

According to a second aspect, an embodiment of this application further provides a current source array. The current source array may be configured to assemble the radio frequency transmitter provided in any implementation of the first aspect. For example, the current source array includes F rows of current source units, a first output signal cable, a second output signal cable, E first branch signal cables, and a compensation circuit, where both F and E are integers greater than 1. The E first branch signal cables are disposed between the F rows of current source units, and the E first branch signal cables are parallel to a row arrangement direction of the F rows of current source units. In the E first branch signal cables, one or more rows of current source units are spaced between any two adjacent first branch signal cables. In the E first branch signal cables, K first branch signal cables are connected to the first output signal cable, and E-K first branch signal cables are connected to the second output signal cable, where K is an integer greater than or equal to 1. A first end of the first output signal cable may output a first output signal of a first current source array. A first end of the second output signal cable may output a second output signal of the current source array. Both of a second end of the first output signal cable and a second end of the second output signal cable are connected to the compensation circuit. The compensation circuit may compensate for the difference of load impedance among a plurality of rows of current source units adjacent to the first branch signal cable.

In a possible implementation, the first output signal cable and the second output signal cable are disposed perpendicular to the row arrangement direction of the F rows of current source units, and the first output signal cable and the second output signal cable are disposed adjacent to each other.

In a possible implementation, the first end of the first output signal cable and the first end of the second output signal cable are disposed on the side close to a current source unit in a first row of the F rows of current source units, and the compensation circuit is disposed on the side close to an $F^{th}$ row of current units in the F rows of current source units.

In a possible implementation, the current source array further includes H rows of current source units and G second branch signal cables, where both H and G are integers greater than 1. The G second branch signal cables are disposed between the H rows of current source units, and the G second branch signal cables are parallel to a row arrangement direction of the H rows of current source units. In the G second branch signal cables, one or more rows of current source units are spaced between any two adjacent second branch signal cables. In the G second branch signal cables, L second branch signal cables are connected to the first output signal cable, and G-L second branch signal cables are connected to the second output signal cable, where L is an integer greater than or equal to 1. The compensation circuit is further configured to compensate for the difference of load impedance among a plurality of rows of current source units adjacent to the second branch signal cable. The H rows of current source units are added to the current source array, to increase the quantity of current source units in the current source array.

In a possible implementation, the H rows of current source units and the F rows of current source units are separated by the first output signal cable and the second output signal cable. In other words, the F rows of current source units are disposed on the side of the first output signal cable that is far away from the second output signal cable, and the H rows of current source units are disposed on the side of the second output signal cable that is far away from the first output signal cable. This disposing manner is used to help reduce the cabling distance between the first output signal cable and the plurality of rows of current source units, and the cabling distance between the second output signal cable and the plurality of rows of current source units.

These aspects or other aspects of this application are more concise and understandable in the description of the following embodiments.

DESCRIPTION OF EMBODIMENTS

To make the objectives, technical solutions, and advantages of this application clearer, the following further describes this application in detail with reference to the accompanying drawings. The specific operation method in the method embodiment may also be applied to an apparatus embodiment or a system embodiment. It should be noted that in the descriptions of this application, "at least one" means one or more, and "a plurality of" means two or more. In view of this, "a plurality of" may also be understood as "at least two" in embodiments of this application. The term "and/or" describes an association relationship for describing associated objects and represents that three relationships may exist. For example, A and/or B may represent the following three cases: Only A exists, both A and B exist, and only B exists. In addition, the character "/" generally represents an "or" relationship between the associated objects. In addition, it should be understood that, in the description of this application, terms "first" and "second" are only used to distinguish the purpose of the description, but cannot be understood as indication or implication of relative importance, and cannot be understood as an indication or implication of a sequence.

The following clearly describes the technical solutions in embodiments of this application with reference to the accompanying drawings in embodiments of this application.

As the modern wireless communication rate is increasing, a radio frequency transmitter with a high output power and high efficiency has become an urgent need. For example, in fields such as millimeter wave band communication in the 5th generation (5G) communication and the terahertz (THz) imaging, performance requirements of a radio frequency transmitter, such as high output power, high efficiency, and high integration level, are urgently increasing.

Figure 1:
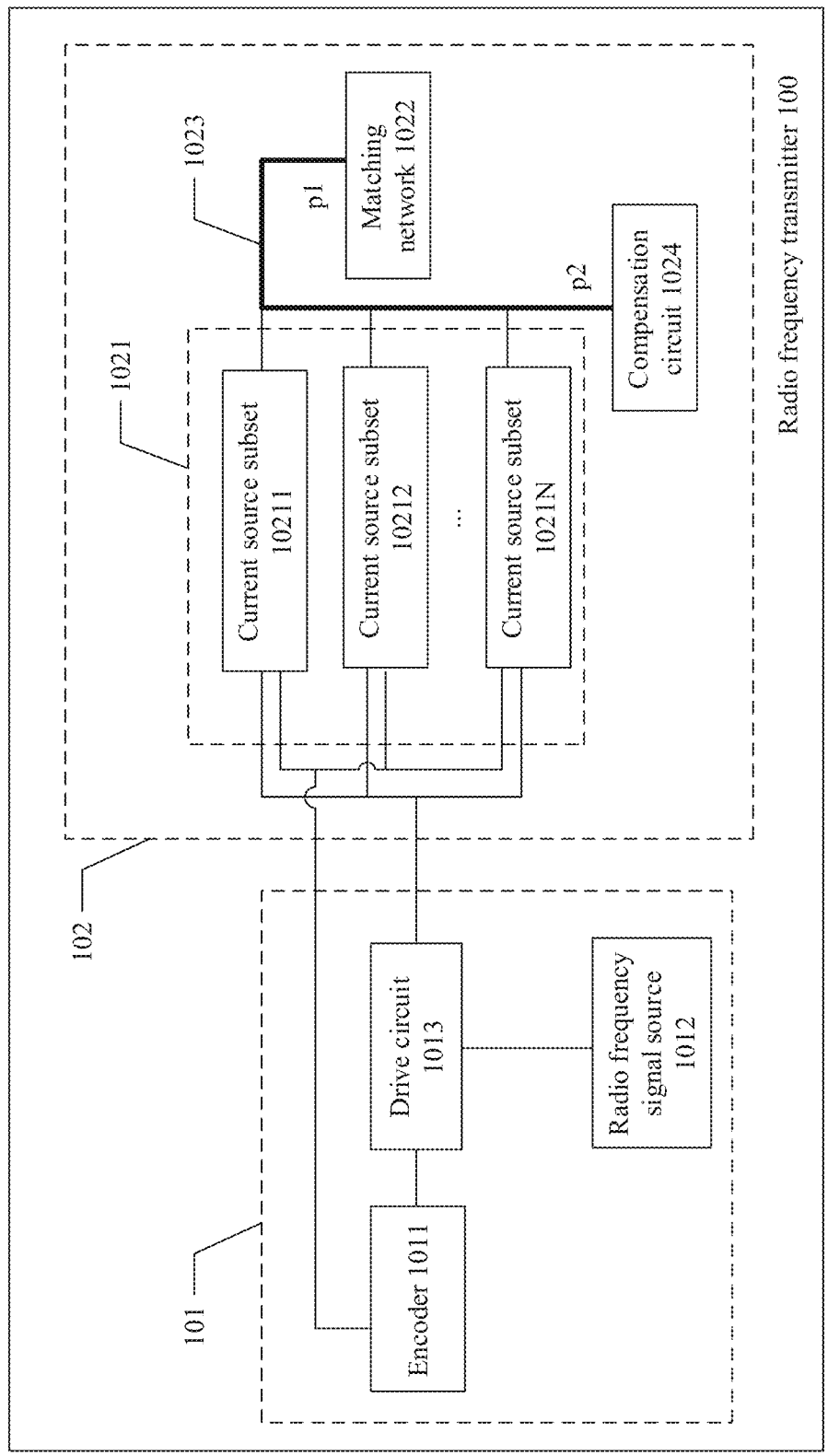
FIG. 1 is a schematic diagram of a structure of a radio frequency transmitter according to an embodiment of this application.

Currently, more radio frequency transmitters are integrated with current source sets, to improve the integration level and transmit efficiency of the radio frequency transmitters. FIG. 1 is a schematic diagram of a structure of a radio frequency transmitter according to an embodiment of this application. The radio frequency transmitter 100 may be a digital transmitter. The radio frequency transmitter 100 includes a control circuit 101 and a radio frequency front-end 102. The radio frequency front-end 102 includes a current source set 1021 and a matching network 1022 and a compensation circuit 1024.

The current source set 1021 includes N current source subsets (10211, 10212, ..., and 1021N), where N is an integer greater than 1, and the current source subset includes at least one current source unit. As shown in FIG. 1, output ends of the N current source subsets are connected in parallel by using an output signal cable 1023. A first end p1 of the output signal cable 1023 is connected to a matching network 1022, and the output signal cable 1023 may output a set output signal of the current source set 1021 to the matching network 1022 by using the first end p1. A set output signal of the current source set 1021 includes N sub-signals respectively output by the N current source subsets. It may also be understood that the N sub-signals respectively output by the N current source subsets are superimposed with each other to form a set output signal O of the current source set 1021.

The control circuit 101 may output a plurality of control signals, where the plurality of control signals is in a one-to-one correspondence with a plurality of current source units in the current source set 1021. For example, if the current source subset includes M current source units, the current source set 1021 includes M*N current source units. The control circuit 101 may output M*N control signals, where an $<m, n>^{th}$ control signal $I_{<m, n>}$ corresponds to an $m^{th}$ current source unit $A_{<m, n>}$ in an $n^{th}$ current source subset of the current source set 1021, where m ranges from 1 to M, and n ranges from 1 to N.

In a possible implementation, the control signals may include a digital sub-signal and a drive signal. In other words, the control signal $I_{<m, n>}$ includes a digital sub-signal $D_{<m, n>}$ and a drive signal $S_{<m, n>}$. Specifically, the control circuit 101 may output M*N digital sub-signals and M*N drive signals. The $<m, n>^{th}$ digital sub-signal $D_{<m, n>}$ corresponds to the $m^{th}$ current source unit $A_{<m, n>}$ in the $n^{th}$ current source subset of the current source set 1021, where m ranges from 1 to M, and n ranges from 1 to N. An $<m, n>^{th}$ drive signal $S_{<m, n>}$ also corresponds to the current source unit $A_{<m, n>}$. The current source unit $A_{<m, n>}$ may output a unit output signal $O_{<m, n>}$ under the control of the digital sub-signal $D_{<m, n>}$ and the drive signal $S_{<m, n>}$.

It should be noted that the quantities of current source units in different current source subsets may also be different. But the embodiments described in this application is still applicable.

Generally, the radio frequency front-end 102 may include one or more current source sets. Based on the quantity of the current source sets, the radio frequency front-end 102 may include at least a single-ended type and a differential type. Specifically, the single-ended radio frequency front-end 102 includes only one current source set. The differential radio frequency front-end 102 may include two current source sets, and set output signals of the two current source sets are reverse signals of each other. Then, two types of the radio frequency front-ends 102 are further described by using the following examples.

Single-Ended Type

Figure 2:
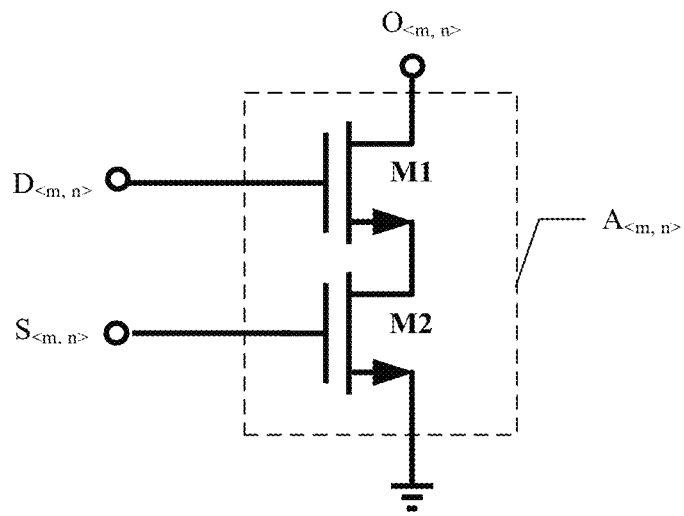
FIG. 2 is a schematic diagram of a circuit structure of a current source unit according to an embodiment of this application.

The radio frequency front-end 102 in FIG. 1 belongs to the single-ended type, and includes only one current source set 1021. Generally, the current source units in the current source set 1021 have the same circuit structure. For example, a circuit structure of the current source unit <m, n> may be shown in FIG. 2. The current source unit includes a first drive tube M1 and a second drive tube M2, and the first drive tube M1 and the second drive tube M2 form a cascade circuit.

Specifically, a source of the first drive tube M1 is connected to a drain of the second drive tube M2, and a source of the second drive tube M2 is grounded. A gate of the first drive tube M1 is configured to receive the digital sub-signal $D_{<m, n>}$ corresponding to the current source unit $A_{<m, n>}$, and a drain of the first drive tube M1 is configured to output the unit output signal $O_{<m, n>}$ of the current source unit <m, n>. A gate of the second drive tube M2 is configured to receive the drive signal $S_{<m, n>}$ corresponding to the current source unit $A_{<m, n>}$.

In the current source set 1021, unit output signals of the current source units are superimposed on each other in the output signal cable 1023, to form the set output signal O of the current source set 1021. In a possible implementation, as shown in FIG. 1, the radio frequency front-end 102 further includes a matching network 1022. The matching network 1022 may perform impedance matching on the set output signal O of the current source set 1021.

Figure 3:
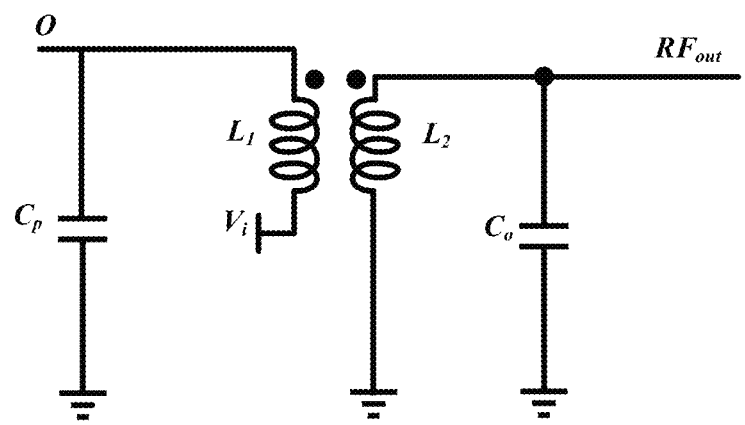
FIG. 3 is a schematic diagram of a circuit structure of a matching network according to an embodiment of this application.

For example, in the single-ended radio frequency front-end 102, a circuit structure of the matching network 1022 may be shown in FIG. 3. Specifically, the matching network 1022 includes a capacitor $C_p$, an inductor $L_1$, an inductor $L_2$, and a capacitor $C_o$. One end of the capacitor $C_p$ is connected to one end of the inductor $L_1$, and the end of the capacitor $C_p$ connected to the inductor $L_1$ may receive the set output signal O of the current source set 1021. The other end of the inductor $L_1$ is configured to receive a power supply voltage Vi, and the other end of the capacitor $C_p$ is grounded. The inductor $L_1$ is magnetically coupled to the inductor $L_2$. One end of the inductor $L_2$ is connected to one end of the capacitor $C_o$, and the other end of the inductor $L_2$ and the other end of the capacitor $C_o$ are grounded. The end of the capacitor $C_o$ connected to the inductor $L_2$ may output an RF output signal $RF_{out}$. The end of the inductor $L_1$ connected to the capacitor $C_p$ and the end of the inductor $L_2$ connected to the capacitor $C_o$ are mutually homologous ends.

In the matching network 1022 shown in FIG. 3, capacitance values of the capacitor $C_p$ and the capacitor $C_o$, and inductance values of the inductor $L_1$ and the inductor $L_2$ are all configured based on load impedance RL of the radio frequency front-end 102 and optimal load impedance Zopt of the current source set 1021. The optimal load impedance Zopt is load impedance obtained through calculation in which efficiency, an output power, and the like of the current source set 1021 are optimal. For the optimal load impedance Zopt, refer to the current technology. Details are not described herein. In other words, the matching network 1022 may match the load impedance RL of the radio frequency front-end 102 as the optimal load impedance Zopt of the current source set 1021. This helps reduce a power loss generated when the RF output signal RFout passes through a load circuit.

Differential Type

Figure 4:
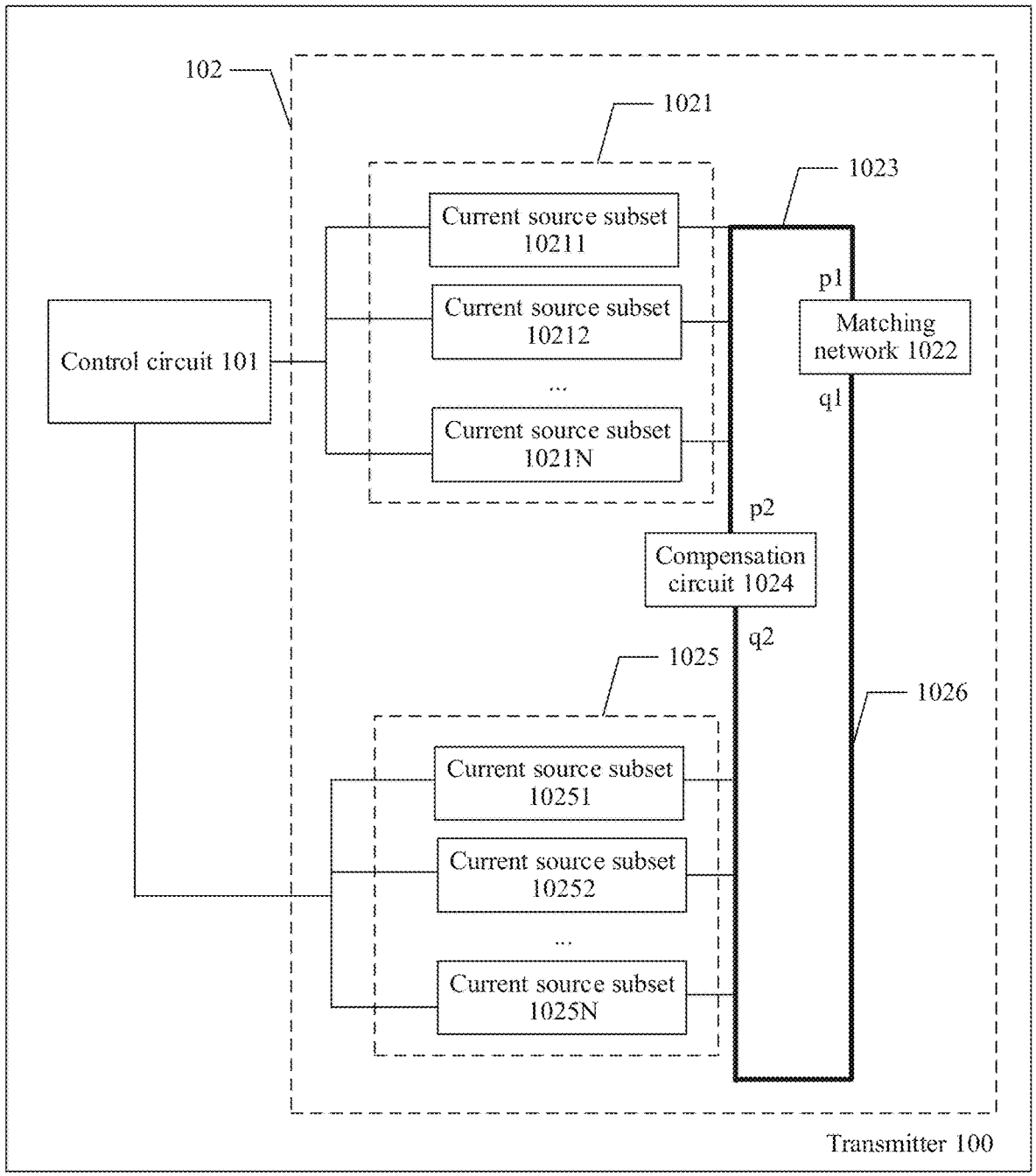
FIG. 4 is a schematic diagram of a structure of a radio frequency transmitter according to an embodiment of this application.

For example, FIG. 4 shows an application of a differential radio frequency front-end 102 in a radio frequency transmitter. As shown in FIG. 4, the radio frequency front-end 102 includes a current source set 1021 and a current source set 1025. The current source set 1025 includes N current source subsets (10251, 10252, ..., and 1025N). Generally, for specific implementations of the current source set 1021 and the current source set 1025 in the differential-type radio frequency front-end 102, refer to the implementation of the current source set 1021 in the single-ended type. Details are not described herein again.

It should be noted that, generally, the current source set 1021 and the current source set 1025 have the same quantity of current source units. A difference lies in that the control circuit 101 provides a plurality of control signals for current source units in the current source set 1021 and current source units in the current source set 1025 respectively, so that a set output signal $O^+$ of the current source set 1021 and a set output signal $O^-$ of the current source set 1025 are reverse signals of each other. The current source set 1021 may also be referred to as a positive-phase current source set, a current source unit in the current source set 1021 may also be referred to as a positive-phase current source unit, and an output signal of the positive-phase current source unit may also be referred to as a positive-phase unit output signal. The current source set 1025 may also be referred to as a negative-phase current source set, a current source unit in the current source set 1025 may also be referred to as a negative-phase current source unit, and an output signal of the negative-phase current source unit may also be referred to as a negative-phase unit output signal.

Specifically, the control circuit 101 may output a plurality of digital sub-signals, positive-phase drive signals, and negative-phase drive signals. The plurality of digital sub-signals output by the control circuit 101 is in a one-to-one correspondence with a plurality of positive-phase current source units in the current source set 1021, and the plurality of digital sub-signals is further in a one-to-one correspondence with a plurality of negative-phase current source units in the current source set 1025. It may also be understood that any digital sub-signal output by the control circuit 101 corresponds to one positive-phase current source unit and one negative-phase current source unit. The digital sub-signal may be used to control a corresponding positive-phase current source unit or a corresponding negative-phase current source unit. The plurality of positive-phase drive signals output by the control circuit 101 is in a one-to-one correspondence with the plurality of positive-phase current source units in the current source set 1021, and the plurality of negative-phase drive signals output by the control circuit 101 is in a one-to-one correspondence with the plurality of negative-phase current sources in the current source set 1025.

Figure 5:
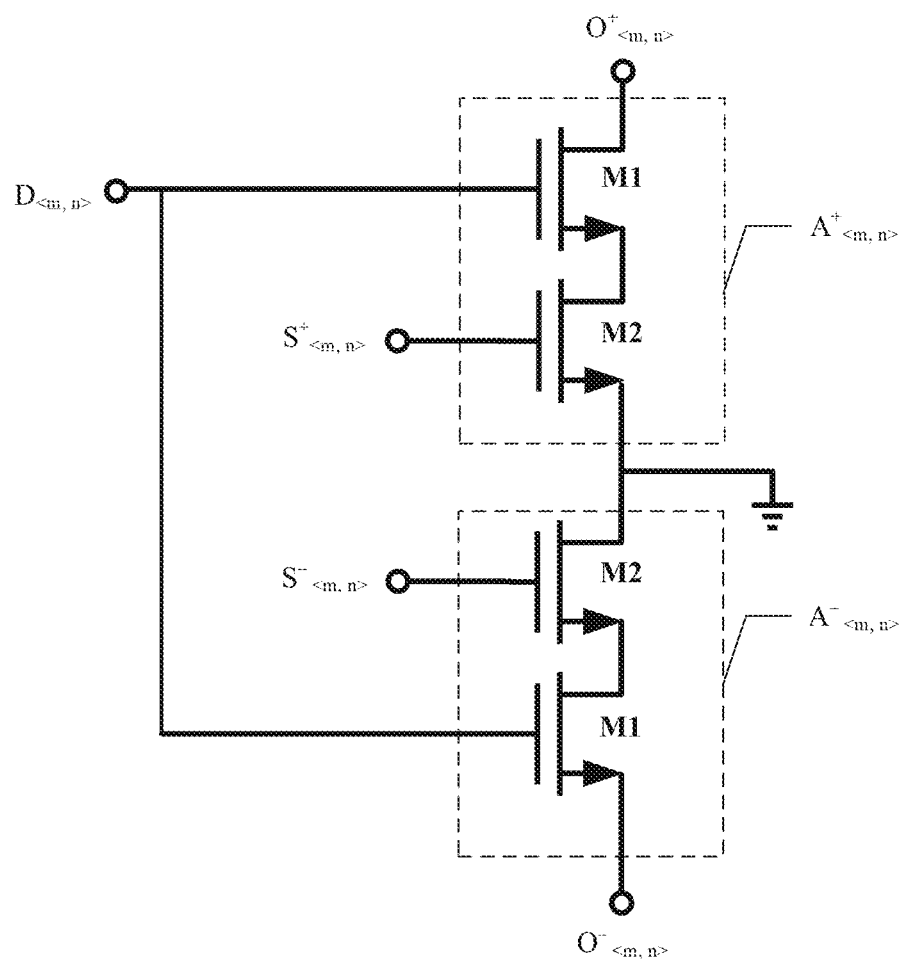
FIG. 5 is a schematic diagram of a correspondence between a positive-phase current source unit and a negative-phase current source unit according to an embodiment of this application.

For example, as shown in FIG. 5, a positive-phase current source unit $A^+_{<m,\ n>}$ corresponds to a digital sub-signal $D_{<m,\ n>}$, and corresponds to a positive-phase drive signal an $S^+_{<m,\ n>}$. In other words, a control signal $I^+_{<m,\ n>}$ corresponding to the positive-phase current source unit $A^+_{<m,\ n>}$ includes the digital sub-signal $D_{<m,\ n>}$ and the positive-phase drive signal $S^+_{<m,\ n>}$. The positive-phase current source unit $A^+_{<m,\ n>}$ may output a unit output signal $O^+_{<m,\ n>}$ under the control of the digital sub-signal $D_{<m,\ n>}$ and the positive-phase drive signal $S^+_{<m,\ n>}$. Unit output signals of the current sources in the current source set 1021 form a set output signal $O^+$ of the current source set 1021.

As shown in FIG. 5, a negative-phase current source unit $A^-_{<m,\ n>}$ corresponds to a digital sub-signal $D_{<m,\ n>}$, and corresponds to a negative-phase drive signal $S^-_{<m,\ n>}$. In other words, a control signal $I^-_{<m,\ n>}$ corresponding to the negative-phase current source unit $A^-_{<m,\ n>}$ includes the digital sub-signal $D_{<m,\ n>}$ and the negative-phase drive signal $S^-_{<m,\ n>}$. The negative-phase current source unit $A^-_{<m,\ n>}$ may output a unit output signal $O^-_{<m,\ n>}$ under the control of the digital sub-signal $D_{<m,\ n>}$ and the negative-phase drive signal $S^-_{<m,\ n>}$. Unit output signals of the current sources in the current source set 1025 form a set output signal $O^-$ of the current source set 1025.

In a possible implementation, as shown in FIG. 4, the matching network 1022 is separately connected to a first end p1 of an output signal cable 1023 in the current source set 1021 and a first end q1 of an output signal cable 1026 in the current source set 1025. The matching network 1022 may perform impedance matching on the set output signal $O^+$ of the current source set 1021 and the set output signal $O^-$ of the current source set 1025.

Figure 6:
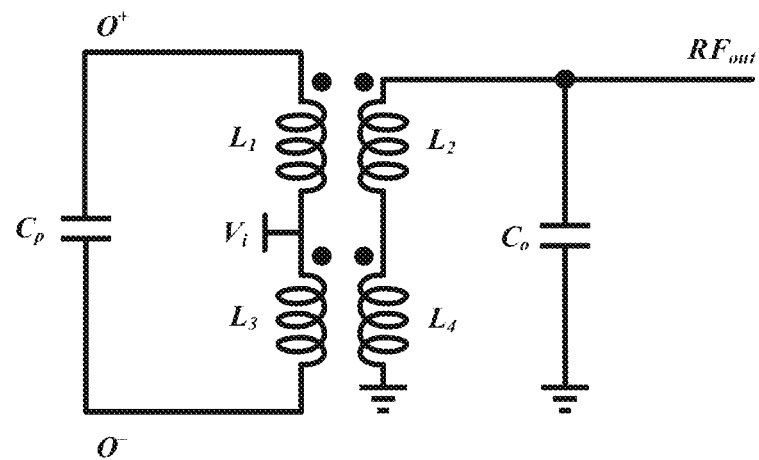
FIG. 6 is a schematic diagram of a circuit structure of a matching network according to an embodiment of this application.

For example, in the differential radio frequency front-end 102, a circuit structure of the matching network 1022 may be shown in FIG. 6. Specifically, the matching network 1022 includes a capacitor $C_p$, an inductor $L_1$, an inductor $L_2$, an inductor $L_3$, an inductor $L_4$, and a capacitor $C_o$. One end of the capacitor $C_p$ is connected to one end of the inductor $L_1$, and the end of the capacitor $C_p$ connected to the inductor $L_1$ may receive the set output signal $O^+$ of the current source set 1021. The other end of the inductor $L_1$ is connected to one end of the inductor $L_3$. The other end of the inductor $L_1$ may further receive a supply voltage Vi. The other end of the inductor $L_3$ is connected to the other end of the capacitor $C_p$. The other end of the capacitor $C_p$ may receive the set output signal $O^-$ of the current source set 1025. The inductor $L_1$ is magnetically coupled to the inductor $L_2$, and the inductor $L_3$ is magnetically coupled to the inductor $L_4$. One end of the inductor $L_2$ is connected to one end of the capacitor $C_o$, and the other end of the inductor $L_2$ is connected to one end of the inductor $L_4$. The other end of the inductor $L_4$ and the other end of the capacitor $C_o$ are grounded. The end of the capacitor $C_o$ connected to the inductor $L_2$ may output an RF output signal $RF_{out}$.

In the matching network 1022 shown in FIG. 6, capacitance values of the capacitor $C_p$ and the capacitor $C_o$, and inductance values of the inductor $L_1$, the inductor $L_2$, the inductor $L_3$, and the inductor $L_4$ are configured based on load impedance RL of the radio frequency front-end 102 and optimal load impedance Zopt of the current source set 1021.

Then, the control circuit 101 is further described by using the single-ended radio frequency front-end 102 as an example. It should be noted that, unless otherwise specified, the following implementation of the control circuit 101 is also applicable to the differential type radio frequency front-end 102.

The radio frequency transmitter provided in some embodiments of this application may be a digital transmitter. In other words, the control circuit 101 may receive a digital signal and generate a plurality of control signals based on the received digital signal. Compared with conventional analog transmitters, digital transmitters have characteristics such as a high integration level, high efficiency and a high power.

As described above, the control signals include a digital sub-signal and a drive signal. For example, as shown in FIG. 1, the control circuit 101 in the digital transmitter includes an encoder 1011, a radio frequency signal source 1012, and a drive circuit 1013. The encoder 1011 may separately provide a plurality of digital sub-signals for the drive circuit 1013 and the current source set 102. Specifically, the encoder 1011 may directly send the plurality of digital sub-signals to the current source set 1021, or the drive circuit 1013 may forward received plurality of digital sub-signals to the current source set 1021. This is not limited in the embodiments of this application.

The radio frequency signal source 1012 may provide a radio frequency input signal to the drive circuit 1013. The drive circuit 1013 may generate a plurality of drive signals based on the radio frequency input signal and the plurality of digital sub-signals.

Generally, a digital polarized transmitter and a digital orthogonal transmitter are two common digital transmitters. The following separately uses the digital polarized transmitter and the digital orthogonal transmitter as examples for description.

Digital Orthogonal Transmitter

In the digital orthogonal transmitter, the encoder 1011 may receive an orthogonal baseband signal. For example, the orthogonal baseband signal includes a baseband signal I and a baseband signal Q that are orthogonal to each other. The baseband signal I may be represented as $I_1, \ldots,$ and $I_B$, and the baseband signal Q may be represented as $Q_1, \ldots,$ and $Q_B$. B represents the quantity of bits of the baseband signal I and the baseband signal Q. The encoder 1011 may encode the orthogonal baseband signal, and convert the orthogonal baseband signal into the foregoing plurality of digital sub-signals based on the quantity of current source units in the current source set 1021.

Figure 7:
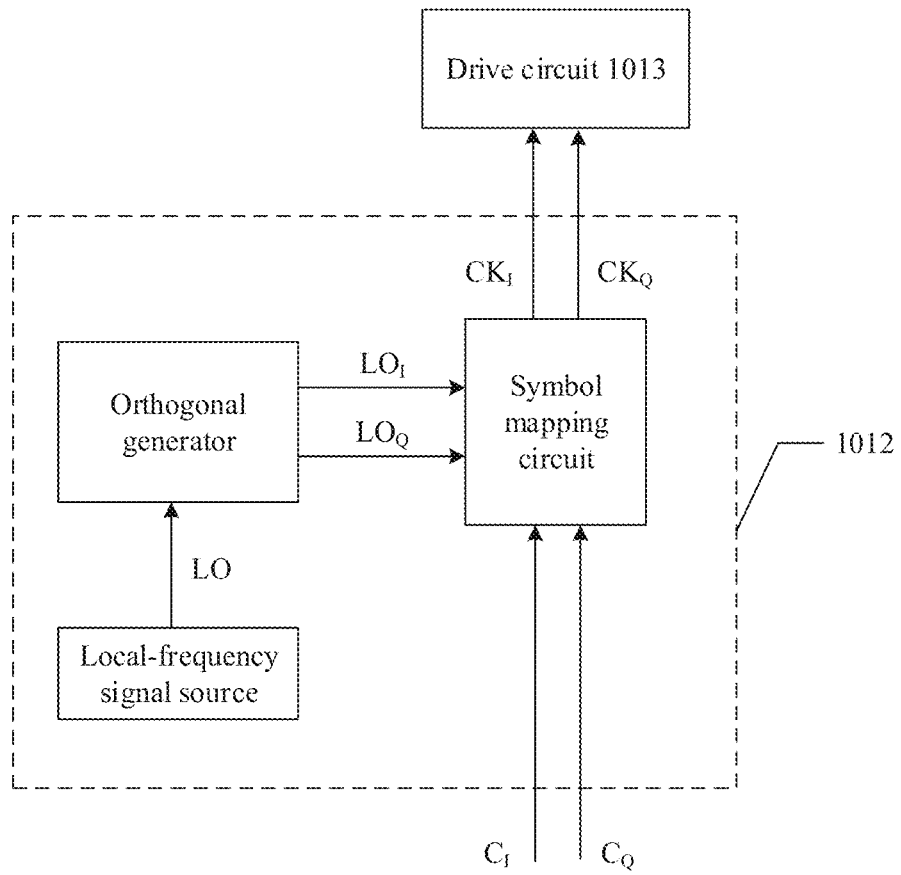
FIG. 7 is a schematic diagram of a structure of a radio frequency signal source according to an embodiment of this application.

The radio frequency signal source 1012 may generate orthogonal radio frequency signals $CK_I$ and $CK_Q$. For example, as shown in FIG. 7, the radio frequency signal source 1012 includes a local-frequency signal source, an orthogonal generator, and a symbol mapping circuit. The local-frequency signal source may generate a local-frequency signal LO. The orthogonal generator may generate, based on the local-frequency signal LO, local-frequency signals $LO_I$ and $LO_Q$ that are orthogonal to each other. The symbol mapping circuit may convert the local-frequency signals $LO_I$ and $LO_Q$ into the orthogonal radio frequency signal $CK_I$ and the orthogonal radio frequency signal $CK_Q$ based on symbol signals ($C_I$ and $C_Q$) of the orthogonal baseband signals.

The drive circuit 1013 may convert the plurality of digital sub-signals, the orthogonal radio frequency signal $CK_I$, and the orthogonal radio frequency signal $CK_Q$ into the foregoing plurality of drive signals. The orthogonal radio frequency signal $CK_I$ is used to generate a first drive signal $S_I$, and the orthogonal radio frequency signal $CK_Q$ is used to generate a second drive signal $S_Q$. Specifically, in the digital orthogonal transmitter, the plurality of drive signals generated by the drive circuit 1013 includes a plurality of first drive signals $S_I$ and a plurality of second drive signals $S_Q$.

In the current source set 1021, some current source units are in a one-to-one correspondence with the plurality of first drive signals $S_I$, and this part of current source units may also be referred to as first current source units. In the current source set 1021, another part of current source units are in a one-to-one correspondence with the second drive signal $S_Q$, and this part of current source units may also be referred to as second current source units. A plurality of first current source units is in a one-to-one correspondence with a plurality of second current source units in the current source set 1021.

Figure 8:
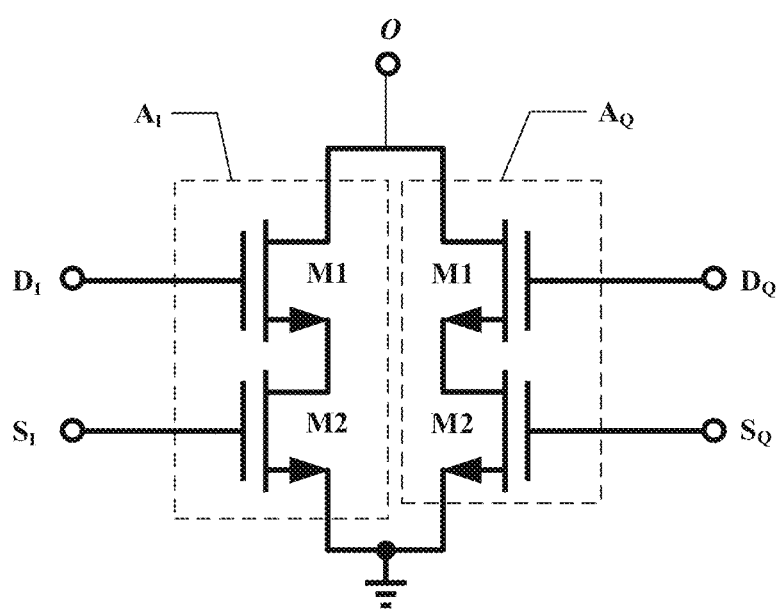
FIG. 8 is a schematic diagram of a correspondence between a first current source unit and a second current source unit according to an embodiment of this application.

For example, as shown in FIG. 8, a first current source unit $A_I$ corresponds to a second current source unit $A_Q$, and a first drive signal $S_I$ that controls the first current source unit $A_I$ corresponds to a second drive signal $S_Q$ that controls the second current source unit $A_Q$. A unit output signal of the first current source unit $A_I$ is orthogonal to a unit output signal of the second current source unit $A_Q$, and the unit output signals of the first current source unit $A_I$ and the second current source unit $A_Q$ may be used to generate a sub-signal o of an output signal O of the current source set 1021. It may also be understood that, in the current source set 1021, unit output signals of the plurality of first current source units and output signals of the plurality of second current source units are superimposed at the output signal cable 1023, to generate the output signal O of the current source set 1021.

It should be noted that, if the radio frequency front-end 102 belongs to the differential type, the orthogonal radio frequency signal $CK_I$ generated by the symbol mapping circuit includes a positive-phase orthogonal radio frequency signal $CK_{I+}$ and a negative-phase orthogonal radio frequency signal $CK_{I-}$. The orthogonal radio frequency signal $CK_Q$ includes a positive-phase orthogonal radio frequency signal $CK_{Q+}$ and a negative-phase orthogonal radio frequency signal $CK_{Q-}$. The positive-phase orthogonal radio frequency signal $CK_{I+}$ is used to generate a first drive signal $S_{I+}$ of the first current source units in the current source set 1021. The negative-phase orthogonal radio frequency signal $CK_{I-}$ is used to generate a first drive signal $S_{I-}$ of the first current source units in the current source set 1025. The positive-phase orthogonal radio frequency signal $CK_{Q+}$ is used to generate a second drive signal $S_{Q+}$ of the second current source units in the current source set 1021. The negative-phase orthogonal radio frequency signal $CK_{Q-}$ is used to generate a second drive signal $S_{Q-}$ of the second current source units in the current source set 1025.

Figure 9:
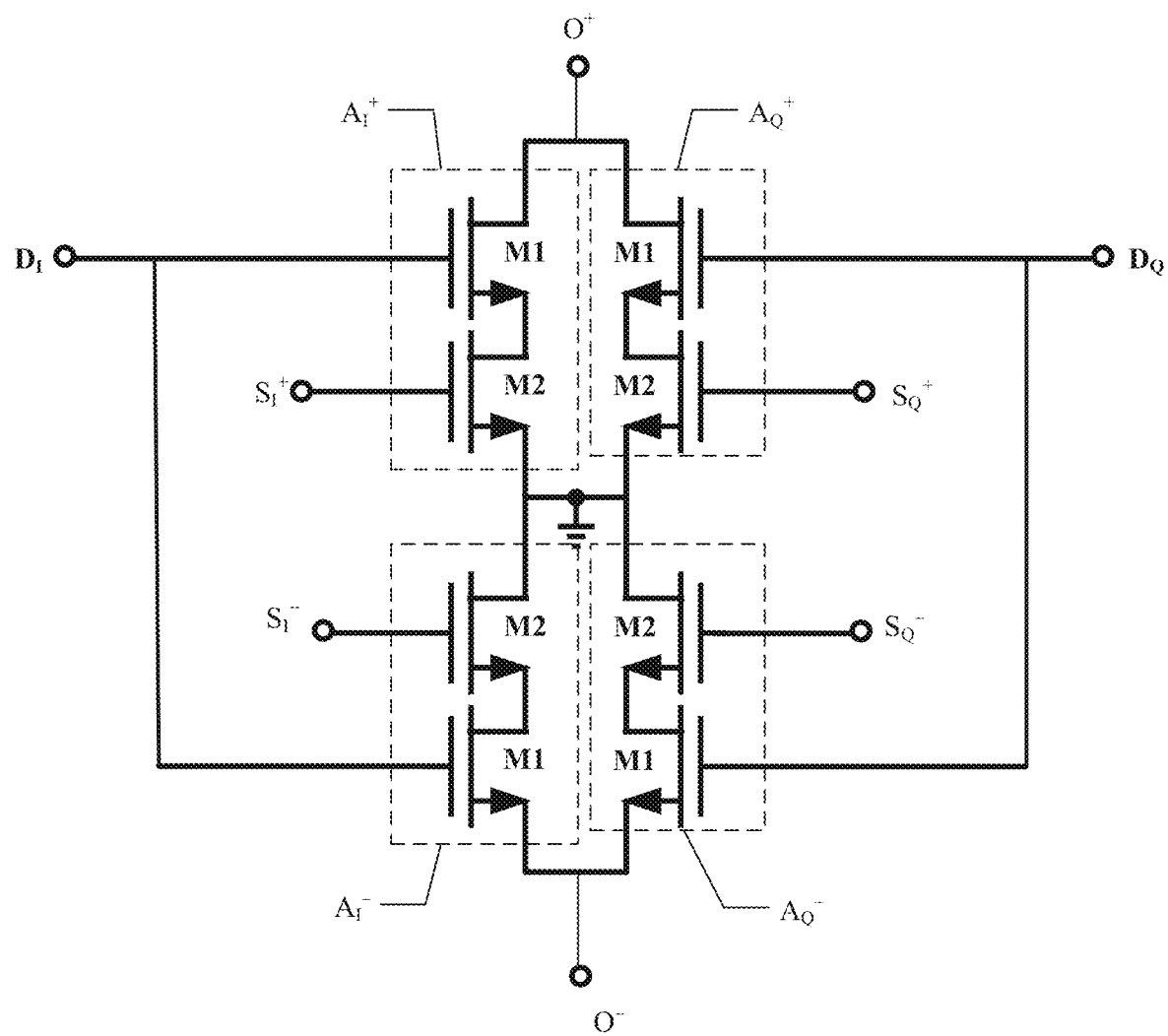
FIG. 9 is a schematic diagram of a correspondence between current source units in a digital orthogonal transmitter having a differential radio frequency front-end according to an embodiment of this application.

For example, FIG. 9 shows the correspondence between a current source unit and a drive signal in the current source set 1021 and the current source set 1025 in a case in which the digital orthogonal transmitter includes the differential radio frequency front-end 102. Specifically, a current source unit $A_{I+}$ is any first positive-phase current source unit in the current source set 1021, and a current source unit $A_{Q+}$ is a second positive-phase current source unit that is in the current source set 1021 and that corresponds to the current source unit $A_{I+}$. A current source unit $A_{I-}$ is a first negative-phase current source unit that is in the current source set 1025 and that corresponds to the current source unit $A_{I+}$. A current source unit $A_{Q-}$ is a second negative-phase current source unit that is in the current source set 1025 and that corresponds to the current source unit $A_{I-}$. In addition, a correspondence also exists between the current source unit $A_{I-}$ and the current source unit $A_{Q+}$.

In FIG. 9, a digital signal $D_I$ and the first drive signal $S_{I+}$ are used to control the current source unit $A_{I+}$. A digital signal $D_Q$ and a second drive signal $S_{Q+}$ are used to control the current source unit $A_{Q+}$. The unit output signals of the current source unit $A_{I+}$ and the current source unit $A_{Q+}$ form a sub-signal $o^+$ of a set output signal $O^+$ of the current source set 1021.

The digital signal $D_I$ and the first drive signal $S_{I+}$ are used to control the current source unit $A_{I-}$. The digital signal $D_Q$ and a second drive signal $S_{Q-}$ are used to control the current source unit $A_{Q-}$. The unit output signals of the current source unit $A_{I-}$ and the current source unit $A_{Q-}$ form a sub-signal $o^-$ of a set output signal $O^-$ of the current source set 1025. The sub-signal $o^+$ and the sub-signal $o^-$ are reverse signals of each other.

Digital Polarized Transmitter

Still refer to FIG. 1. In the digital polarized transmitter, the encoder 1011 may receive a baseband amplitude signal a. For example, the baseband amplitude signal may be represented as $a_1, \ldots,$ and $a_B$. The encoder 1011 may encode the baseband amplitude signal a, and convert the baseband amplitude signal a into the foregoing plurality of digital sub-signals based on the quantity of current source units in the current source set 1021.

Figure 10:
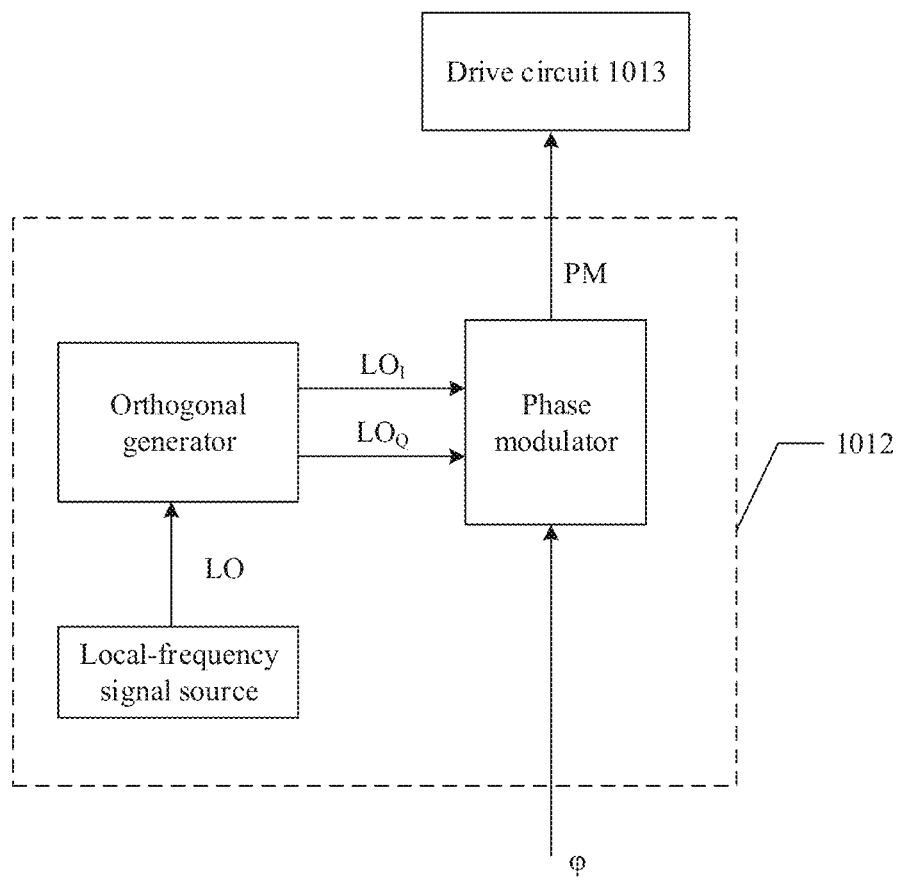
FIG. 10 is a schematic diagram of a structure of a radio frequency signal source according to an embodiment of this application.

The radio frequency signal source 1012 may generate a phase modulation signal PM. For example, as shown in FIG. 10, the radio frequency signal source 1012 includes a local-frequency signal source, an orthogonal generator, and a phase modulator. The local-frequency signal source may generate a local-frequency signal LO. The orthogonal generator may perform phase modulation on the local-frequency signal to obtain local-frequency signals $LO_1$ and $LO_Q$ that are orthogonal to each other. The phase modulator may convert the local-frequency signals $LO_1$ and $LO_Q$ into the phase modulation signal PM based on a baseband phase signal φ corresponding to the baseband amplitude signal a. Both of the baseband amplitude signal a and the baseband phase signal φ are obtained based on a baseband signal input to the radio frequency transmitter 100.

The drive circuit 1013 may convert the plurality of digital sub-signals provided by the encoder 1011 and the phase modulation signal PM provided by the radio frequency signal source 1012 into the plurality of drive signals.

The foregoing describes a basic architecture of the radio frequency transmitter 100. However, whether the digital orthogonal transmitter, the digital polarization transmitter, or another radio frequency transmitter implemented based on a current source set operates in a millimeter wave band, a problem of low efficiency may occur.

Figure 11:
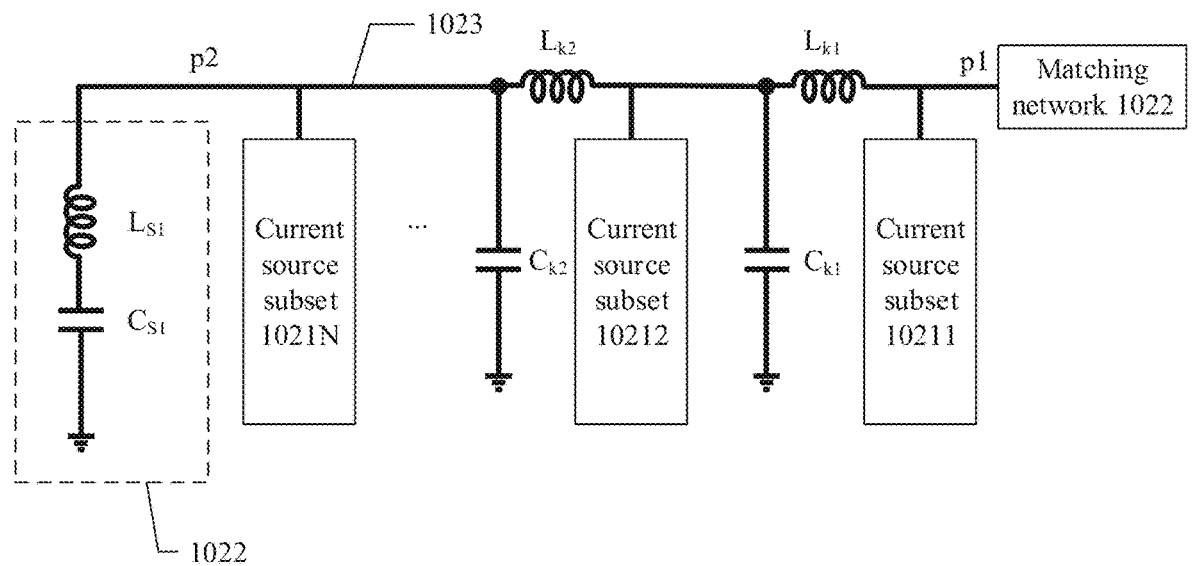
FIG. 11 is a schematic diagram of a parasitic effect in a current source set according to an embodiment of this application.

Specifically, in a case in which the radio frequency transmitter 100 operates in the millimeter wave band, a complex interconnection cable in the current source set 1021 causes a severe parasitic effect. This reduces the efficiency of the radio frequency transmitter 100. As shown in FIG. 11, a current source subset (10211, 10212, . . . , and 1021N) is connected in parallel to the output signal cable 1023. Due to the parasitic effect, a parasitic capacitor and a parasitic inductor appear between adjacent current source subsets. For example, a parasitic inductor $L_{k1}$ is connected in series between the current source subset 10211 and the current source subset 10212, and a parasitic capacitor $C_{k1}$ is connected in parallel between the current source subset 10211 and the current source subset 10212. Similarly, a parasitic inductor $L_{k2}$ is connected in series between the current source subset 10212 and the current source subset 10213 (not shown in the figure), and a parasitic capacitor $C_{k2}$ is connected in parallel between the current source subset 10212 and the current source subset 10213.

Due to existence of the parasitic inductor and the parasitic capacitor, load impedance of different current source subsets in the current source set 1021 is different. In other words, an impedance mismatch occurs in the current source set 1021. The impedance mismatch increases a power loss of the current source set 1021. This reduces the efficiency of the radio frequency transmitter 100.

In view of this, as shown in FIG. 1, the radio frequency transmitter 100 provided in some embodiments of this application further includes a compensation circuit 1024, and the compensation circuit 1024 is connected to a second end p2 of the output signal cable. The compensation circuit 1024 may compensate for the difference of load impedance among the current source subsets in the current source set 1021. Therefore, disposing the compensation circuit 1024 in the radio frequency transmitter 100 helps reduce the difference of load impedance among the current source subsets. This helps improve the efficiency of the radio frequency transmitter 100.

Then, the compensation circuit 1024 is further described by using a single-ended type radio frequency front-end and a differential type radio frequency front-end as examples.

Single-Ended Type

As shown in FIG. 11, in the single-ended radio frequency front-end 102, the compensation circuit 1022 includes a compensation inductor $L_{s1}$ and a compensation capacitor $C_{s1}$. The compensation circuit 1022 is grounded through the compensation inductor $L_{s1}$ and the compensation capacitor $C_{s1}$. Specifically, one end of the compensation inductor $L_{s1}$ is connected to a second end p2 of the output signal cable 1023. The other end of the compensation inductor $L_{s1}$ is connected to one end of the compensation capacitor $C_{s1}$. The other end of the compensation capacitor $C_{s1}$ is grounded. Specifically, grounding in this application refers to ground potential of an alternating-current signal. For example, for a single-ended circuit, ground potential may be ground potential of a direct-current signal or power potential of a direct-current signal, and for a differential circuit, ground potential may be intermediate potential of a differential signal.

The compensation inductor $L_{s1}$ and the compensation capacitor $C_{s1}$ may form an LC resonant circuit, so that two transmission zeros fz1 and fz2 are added to a load impedance curve of each current source subset. Between the two transmission zeros fz1 and fz2, load impedance of each current source subset increases as an operating frequency increases. After reaching a maximum value, the load impedance of each current source subset decreases as the operating frequency increases.

An inductance value of the compensation inductor $L_{s1}$ and a capacitance value of the compensation capacitor $C_{s1}$ are properly configured, so that the load impedance of each current source subset may form a maximum value close to optimal load impedance Zopt between the two transmission zero points fz1 and fz2, an operating frequency corresponding to the maximum value is within an operating band of the radio frequency transmitter 100, therefore, the difference of load impedance of each current source subset is reduced.

In addition, the inductance value of the compensation inductor $L_{s1}$ and the capacitance value of the compensation capacitor $C_{s1}$ are properly configured, so that the load impedance of each current source subset may be adjusted to a value close to the optimal load impedance Zopt in the operating frequency band. It can be learned that, by using the compensation circuit 1022 provided in some embodiments of this application, load impedance of the current source subsets can be close to the same load impedance. This helps reduce the difference of load impedance among the current source subsets, and improve the efficiency of the radio frequency transmitter 100. In addition, because the load impedance of each current source subset after compensation is close to the same load impedance, namely, the optimal load impedance Zopt, the compensation circuit 1022 provided in embodiments of this application further helps increase an output power of the radio frequency transmitter 100.

In some embodiments of this application, the compensation inductor $L_{s1}$ may be an inductor with an adjustable inductance value or may be an inductor with a non-adjustable inductance value. The compensation capacitor $C_{s1}$ may be a capacitor with an adjustable capacitance value or may be a capacitor with a non-adjustable capacitance value. In a case in which at least one of the compensation inductor $L_{s1}$ and the compensation capacitor $C_{s1}$ is an adjustable element (an adjustable inductor or an adjustable capacitor), values of the transmission zero points fz1 and fz2 may be flexibly adjusted by adjusting a value of the adjustable element. This helps flexibly adjust an operating bandwidth of the radio frequency transmitter 100. For example, in a case in which fz1 is less than fz2, increasing a value of fz1 helps increase the operating bandwidth of the radio frequency transmitter 100. This improves performance of the radio frequency transmitter 100 in a higher frequency range.

Differential Type

The differential radio frequency front-end 102 includes two current source sets: the current source set 1021 (a positive-phase current source set) and the current source set 1025 (a negative-phase current source set).

In a possible implementation, the radio frequency front-end may include two compensation circuits. One compensation circuit is connected to the second end p2 of the output signal cable 1023, and is configured to compensate for the difference of load impedance among the N current source subsets in the current source set 1021. The other compensation circuit is connected to a second end q2 of the output signal cable 1026, and is configured to compensate for the difference of load impedance among the N current source subsets in the current source set 1025. For specific structures of the two compensation circuits, refer to the compensation circuit 1022 shown in FIG. 11. Details are not described herein again.

In another possible implementation, as shown in FIG. 4, one end of the compensation circuit 1022 is connected to the second end p2 of the output signal cable 1023, and the other end of the compensation circuit 1022 is connected to the second end q2 of the output signal cable 1026. The compensation circuit 1022 may not only compensate for the difference of load impedance among the N current source subsets in the current source set 1021, but also compensate for the difference of load impedance among the N current source subsets in the current source set 1025.

Figure 12:
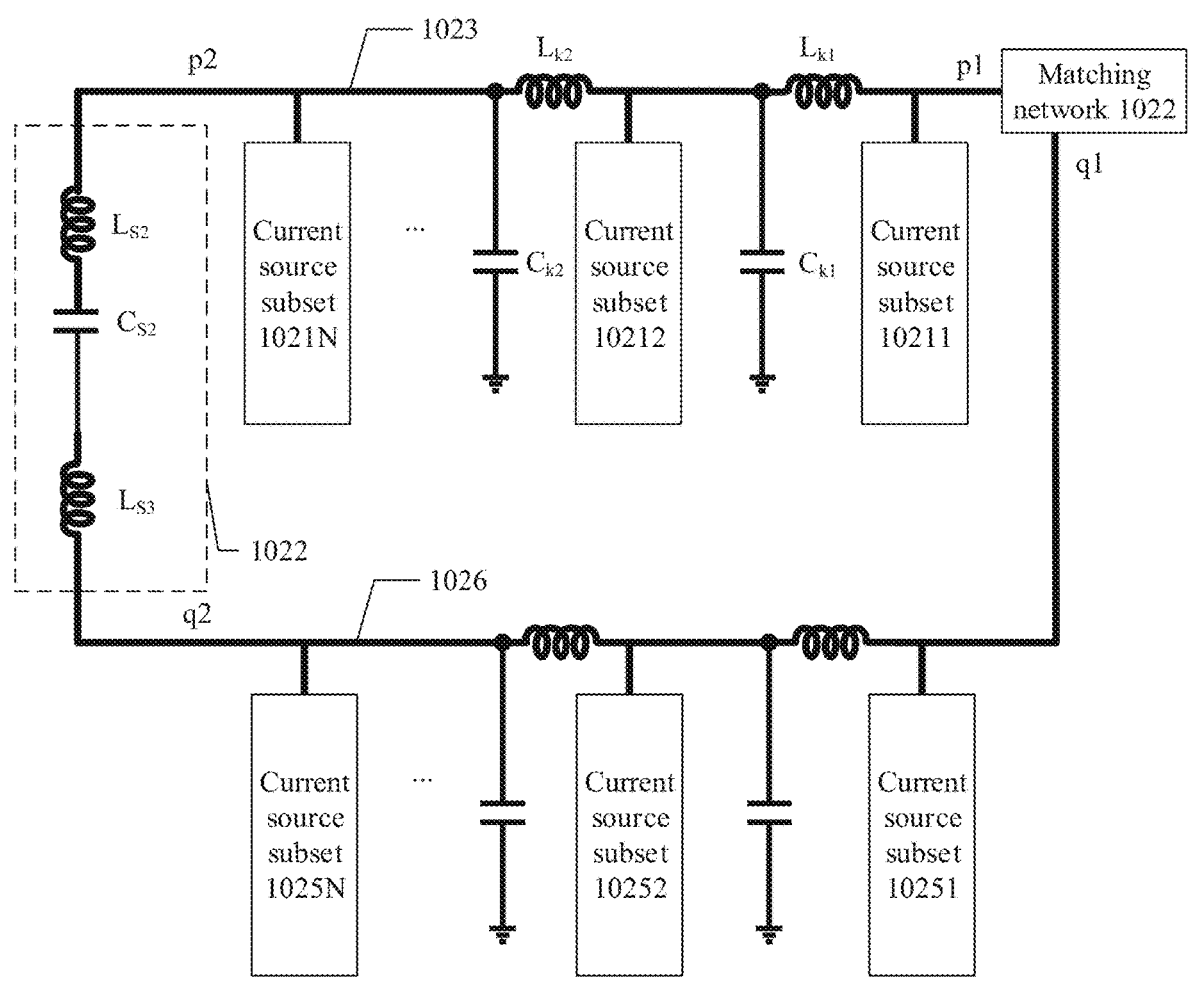
FIG. 12 is a schematic diagram of a structure of a compensation circuit according to an embodiment of this application.

For example, as shown in FIG. 12, the compensation circuit 1022 includes a compensation inductor $L_{s2}$, a compensation capacitor $C_{s2}$, and a compensation inductor $L_{s3}$. The compensation inductor $L_{s2}$, the compensation capacitor $C_{s2}$, and the compensation inductor $L_{s3}$ are sequentially connected in series. Specifically, one end of the compensation inductor $L_{s2}$ is connected to the second end p2 of the output signal cable 1023, and the other end of the compensation inductor $L_{s2}$ is connected to one end of the compensation capacitor $C_{s2}$. The other end of the compensation capacitor $C_{s2}$ is connected to one end of the compensation inductor $L_{s3}$, and the other end of the compensation inductor $L_{s3}$ is connected to the second end q2 of the output signal cable 1026.

It may be understood that polarities of the two ends of the compensation capacitor $C_{s2}$ are opposite. Therefore, an electric potential 0 point exists between the two ends of the compensation capacitor $C_{s2}$. It may also be understood that a virtual ground exists between the two ends of the compensation capacitor $C_{s2}$. Therefore, the compensation circuit 1022 may have a compensation effect similar to that of the compensation circuit 1022 in FIG. 11 for both of the current source set 1021 and the current source set 1025.

In some embodiments of this application, the compensation inductor $L_{s2}$ may be an inductor with an adjustable inductance value or may be an inductor with a non-adjustable inductance value. The compensation capacitor $C_{s2}$ may be a capacitor with an adjustable capacitance value or may be a capacitor with a non-adjustable capacitance value. The compensation inductor $L_{s3}$ may be an inductor with an adjustable inductance value or may be an inductor with a non-adjustable inductance value. In a case in which at least one of the compensation inductor $L_{s2}$, the compensation capacitor $C_{s2}$, and the compensation inductor $L_{s3}$ is an adjustable element (the adjustable inductor or the adjustable capacitor), values of the transmission zero points fz1 and fz2 may be flexibly adjusted by adjusting a value of the adjustable element. This helps flexibly adjust an operating bandwidth of the radio frequency transmitter 100.

In conclusion, in some embodiments of this application, the compensation circuit 1022 is disposed in the radio frequency transmitter 100, to compensate for the difference of load impedance among the N current source subsets in the current source set. This improves the efficiency of the radio frequency transmitter 100.

Based on the same technical concept, an embodiment of this application further provides a current source array. The current source array may be configured to implement any radio frequency transmitter provided in the foregoing embodiments. For example, the current source array may be applied to a digital polarized transmitter or a digital orthogonal transmitter. The current source array may be used to implement a single-ended radio frequency front-end or a differential radio frequency front-end. The following separately describes the foregoing scenarios.

Digital Polarized Transmitter

Single-Ended Radio Frequency Front-End

Figure 13:
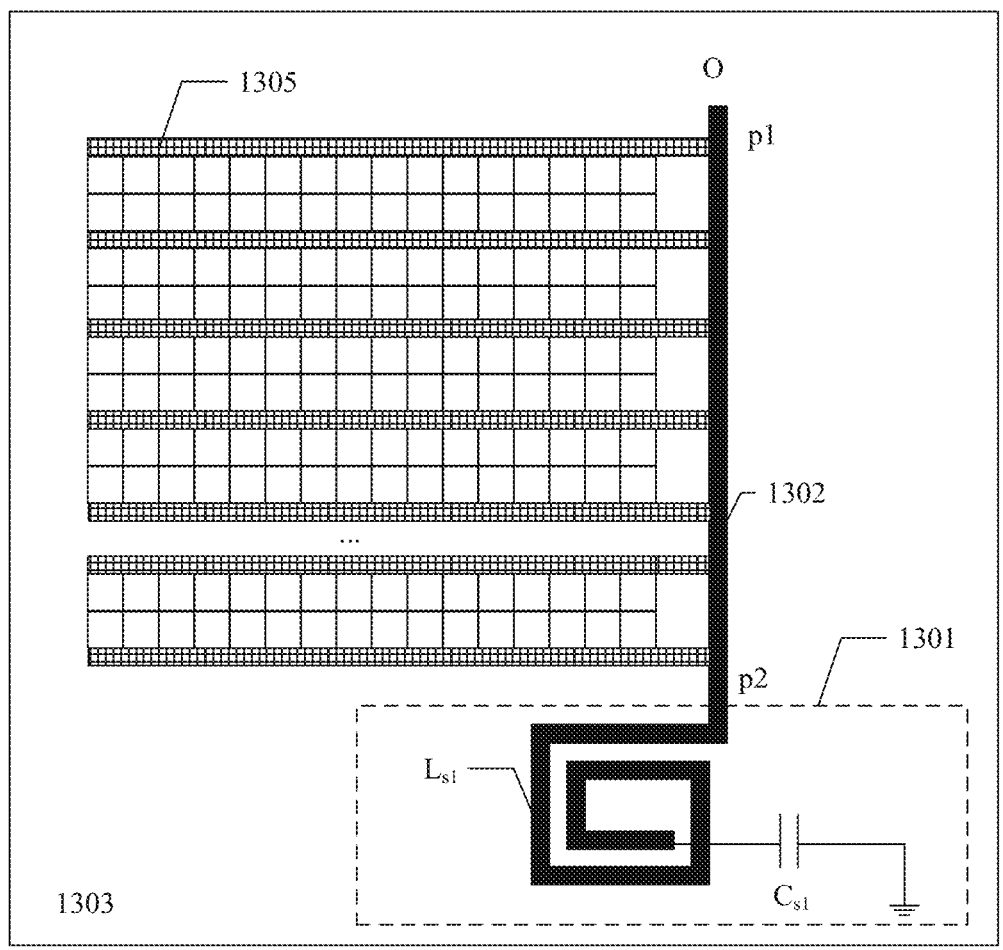
FIG. 13 is a schematic diagram of a structure of a current source array according to an embodiment of this application.

As shown in FIG. 13, the current source array includes F rows of current source units, an output signal cable 1302, a compensation circuit 1301, and E branch signal cables 1305. In a possible implementation, a substrate 1303 may be further included. The substrate 1303 may be configured to carry the F rows of current source units, the output signal cable 1302, the compensation circuit 1301, and the E branch signal cables 1305.

A blank grid in the current source array represents a current source unit. In a case in which the radio frequency front-end of the digital polarized transmitter belongs to the single-ended type, the compensation circuit 1301 includes a compensation inductor $L_{s1}$ and a compensation capacitor $C_{s1}$. One end of the compensation inductor $L_{s1}$ is connected to a first end of the output signal cable 1302, and the other end of the compensation inductor $L_{s1}$ is connected to one end of the compensation capacitor $C_{s1}$. The other end of the compensation capacitor $C_{s1}$ is grounded.

Refer to FIG. 13 and FIG. 1. The F rows of current source units in FIG. 13 may be equivalent to the current source units in the current source set 1021 in FIG. 1, and the output signal cable 1302 in FIG. 13 may be equivalent to the output signal cable 1023 in FIG. 1.

As shown in FIG. 13, the E branch signal cables 1305 are disposed between the F rows of current source units, and the E branch signal cables are all parallel to a row arrangement direction of the current source units. In addition, one or more rows of current source units are spaced between any adjacent branch signal cables 1305. The branch signal cable 1305 may transmit a unit output signal of a current source unit adjacent to the branch signal cable 1305 to the output signal cable 1302. A first end p1 of the output signal cable 1302 may output a set output signal O, and a second end p2 of the output signal cable 1302 is connected to the compensation inductor $L_{s1}$.

Differential Radio Frequency Front-End

Figure 14:
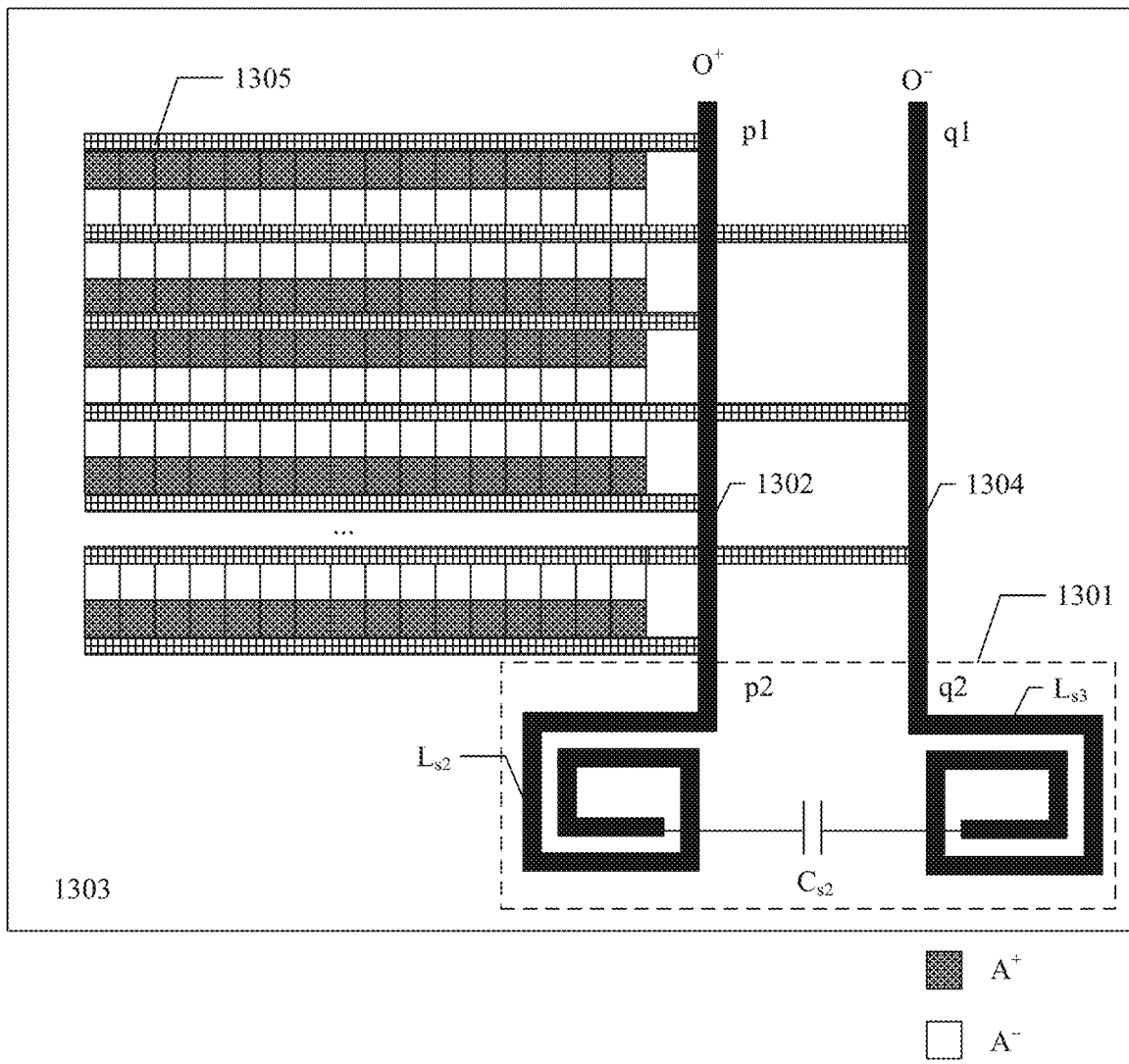
FIG. 14 is a schematic diagram of a structure of a current source array according to an embodiment of this application.

As shown in FIG. 14, the current source array further includes an output signal cable 1304. In the F rows of current source units, K branch signal cables 1305 are connected to a first output signal cable, and E-K branch signal cables 1305 are connected to the output signal cable 1304, where K is an integer greater than or equal to 1. Generally, in the structure shown in FIG. 14, K=F/2, and F is an even number.

A current source unit connected to the output signal cable 1302 by using the branch signal cable 1305 may be understood as a positive-phase current source unit $A^+$. A current source unit connected to the output signal cable 1304 by using the branch signal cable 1305 may be understood as a negative-phase current source unit $A^-$.

Generally, a row of current source units formed by the positive-phase current source unit $A^+$ and the negative-phase current source unit $A^-$ may be alternately arranged. In a case in which the radio frequency front-end of the digital polarized transmitter belongs to the differential type, the compensation circuit 1301 may include a compensation inductor $L_{s2}$, a compensation capacitor $C_{s2}$, and a compensation inductor $L_{s3}$. The compensation inductor $L_{s2}$, the compensation capacitor $C_{s2}$, and the compensation inductor $L_{s3}$ are sequentially connected in series.

As shown in FIG. 14, in some embodiments of this application, the compensation inductor $L_{s2}$ may be disposed adjacent to the output signal cable 1302, the compensation inductor $L_{s3}$ may be disposed adjacent to the output signal cable 1304, and the compensation capacitor $C_{s2}$ may be disposed between the compensation inductor $L_{s2}$ and the compensation inductor $L_{s3}$. A disposing manner shown in FIG. 14 is used to help reduce a cabling length.

Refer to FIG. 14 and FIG. 4. In the current source array in FIG. 14, a plurality of rows of current source units connected to the output signal cable 1302 may be equivalent to the current source set 1021 in FIG. 4, where the current source units are positive-phase current source units $A^+$. A plurality of rows of current source units connected to the output signal cable 1304 may be equivalent to the current source set 1025 in FIG. 4, where the current source units are negative-phase current source units $A^-$.

The output signal cable 1302 is equivalent to the output signal cable 1023 in FIG. 4, and may receive a unit output signal of the positive-phase current source unit $A^+$, to output a set output signal $O^+$ of the current source set 1021. The output signal cable 1304 is equivalent to the output signal cable 1026 in FIG. 4, and may receive a unit output signal of the negative-phase current source unit $A^-$, to output a set output signal $O^-$ of the current source set 1025.

As shown in FIG. 14, the output signal cable 1302 and the output signal cable 1304 are disposed perpendicular to a row arrangement direction of the F rows of current source units, and the output signal cable 1302 and the output signal cable 1304 are disposed adjacent to each other. This disposing manner is used to help reduce a cabling length of the branch signal cables 1305.

As shown in FIG. 14, the first end p1 of the output signal cable 1302 and a first end q1 of the output signal cable 1304 are disposed on the side close to a first row of current source unit in the F rows of current source units. The compensation circuit 1301 is disposed on the side close to an $F^{th}$ row of current source unit in the F rows of current source units. In other words, F rows of current source units are spaced between the first end p1 and the second end p2 of the output signal cable 1302. The same applies to the output signal cable 1304. This disposing manner is used to help reduce cabling lengths of the output signal cable 1302 and the output signal cable 1304.

Digital Orthogonal Transmitter
Single-Ended Radio Frequency Front-End

Figure 15:
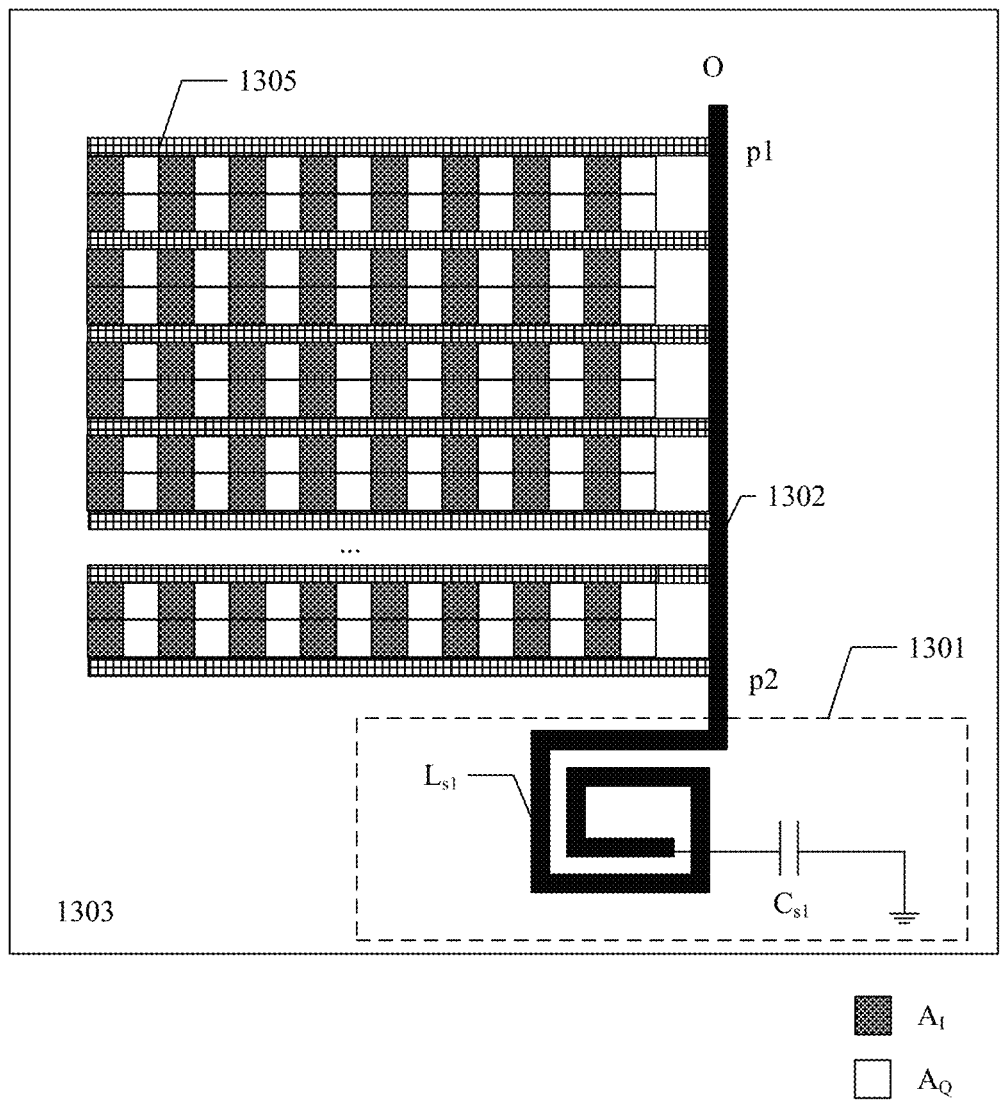
FIG. 15 is a schematic diagram of a structure of a current source array according to an embodiment of this application.

As shown in FIG. 15, the current source array includes a plurality of first current source unit $A_I$ and a plurality of second current source unit $A_Q$. For any row of current source units, the first current source unit $A_I$ and the second current source unit $A_Q$ are alternately disposed. The E branch signal cables 1305 in the current source array are connected to the output signal cable 1302. The current source array shown in FIG. 15 is similar to that in FIG. 13. Details are not described again.

Orthogonal Radio Frequency Front-End

Figure 16:
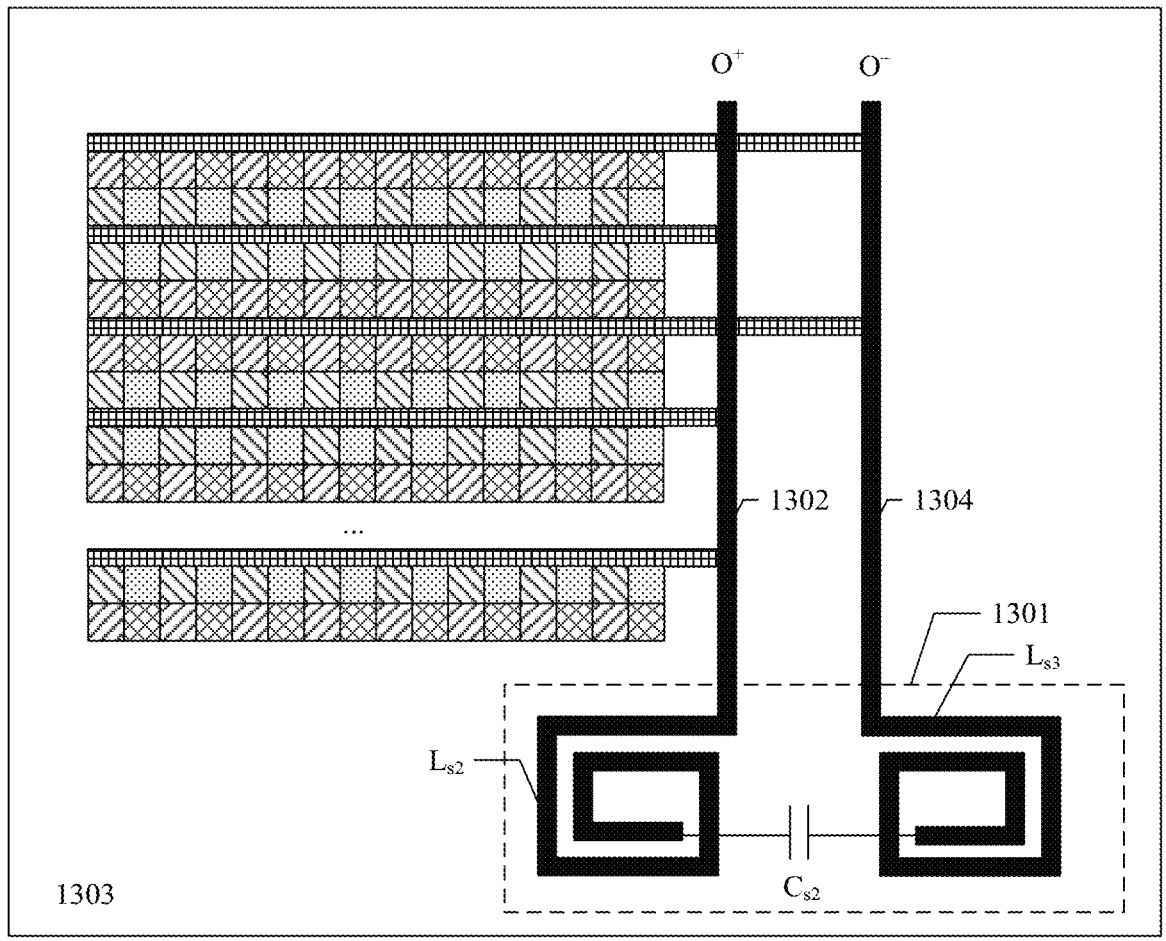
FIG. 16 is a schematic diagram of a structure of a current source array according to an embodiment of this application.

The current source array shown in FIG. 16 has a structure similar to that of the current source array shown in FIG. 14, and a difference lies in that any row of positive-phase current source units $A^+$ further includes a first current source unit $A_{1+}$ and a second current source unit $A_{Q+}$ that are alternately disposed. Any row of negative-phase current source units $A^-$ further includes a first current source unit $A_{1-}$ and a second current source unit $A_{Q-}$ that are alternately disposed.

In a possible implementation, the current source array may further include another H rows of current source units and G branch signal cables 1306, where H and G are integers greater than 1, to increase the quantity of current source units. For example, the radio frequency front-end is a differential digital orthogonal transmitter, and a current source array applicable to the digital orthogonal transmitter may be shown in FIG. 17.

The G branch signal cables 1306 are disposed between the H rows of current source units, and the G branch signal cables 1306 are parallel to a row arrangement direction of the H rows of current source units. In the G branch signal cables 1306, one or more rows of current source units are spaced between any two adjacent branch signal cables 1306. In the G branch signal cables 1306, L branch signal cables 1306 are connected to the output signal cable 1302, and G-L second branch signal cables are connected to the output signal cable 1304, where L is an integer greater than or equal to 1. In this case, the compensation circuit 1301 may further compensate for the difference of load impedance among a plurality of rows of current source units adjacent to the branch signal cable 1306.

Figure 17:
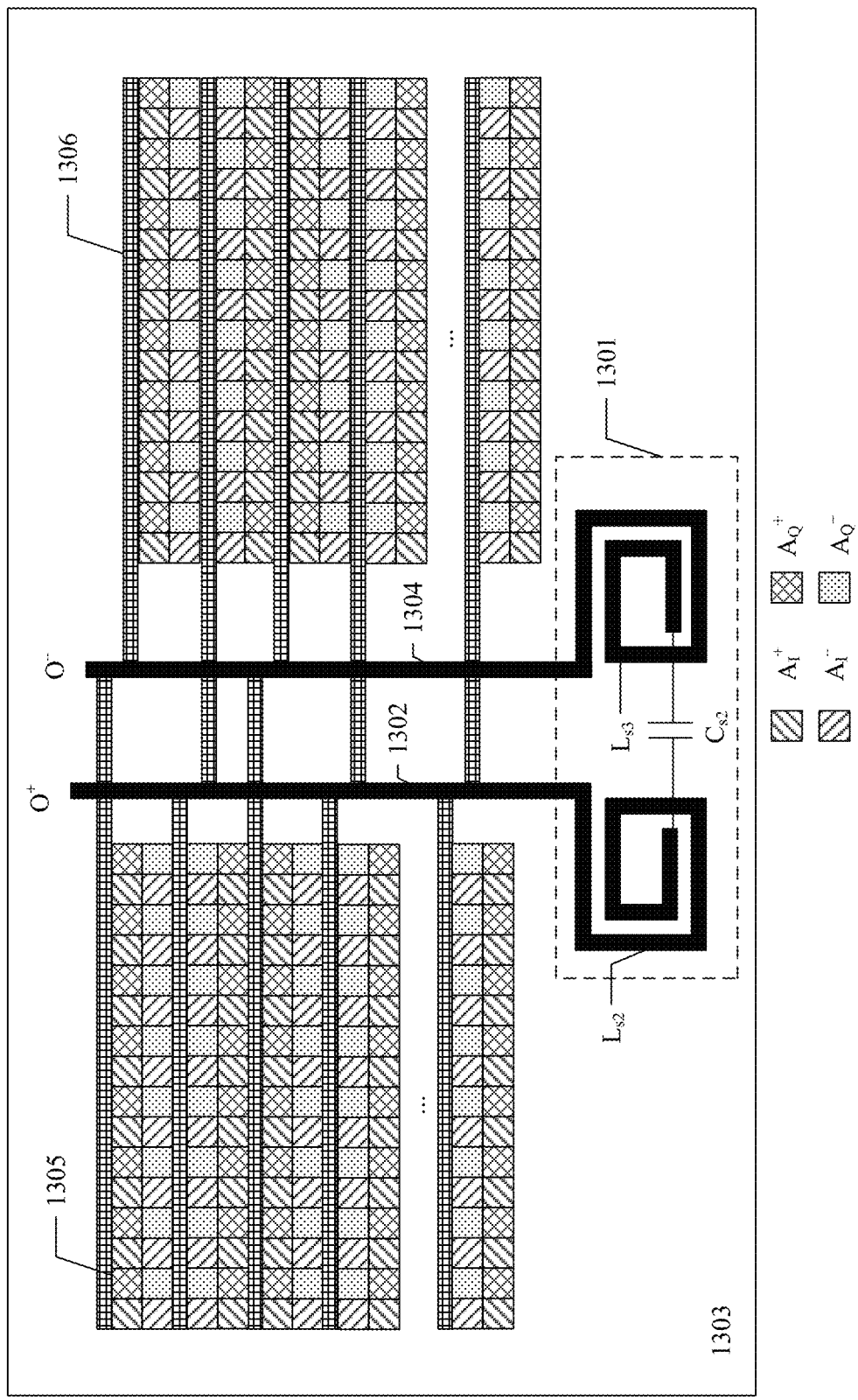
FIG. 17 is a schematic diagram of a structure of a current source array according to an embodiment of this application.

As shown in FIG. 17, the output signal cable 1302 and the output signal cable 1304 may be disposed between the F rows of current source units and the H rows of current source units, to reduce a cabling length. It may also be understood that the F rows of current source units are disposed on the side of the output signal cable 1302 that is far from the output signal cable 1304, and the H rows of current source units are disposed on the side of the output signal cable 1304 that is far from the output signal cable 1302.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. A radio frequency transmitter, comprising a radio frequency front-end and a control circuit, wherein the radio frequency front-end comprises a current source set, a compensation circuit, and a matching network;

the current source set comprises N current source subsets, wherein N is an integer greater than 1, the current source subset comprises at least one current source unit, output ends of the N current source subsets are connected in parallel by using an output signal cable, a first end of the output signal cable is connected to the matching network, and a second end of the output signal cable is connected to the compensation circuit;

the compensation circuit is configured to compensate for a difference of load impedance between the N current source subsets;

the control circuit is configured to output a plurality of control signals, wherein the plurality of control signals is in a one-to-one correspondence with a plurality of current source units in the current source set;

the plurality of current source units in the current source set is configured to output unit output signals under control of corresponding control signals, wherein set output signals of the current source set comprise the unit output signals of the plurality of current source units; and the matching network is configured to perform impedance matching on the set output signals of the current source set.

2. The radio frequency transmitter according to claim 1, wherein the compensation circuit comprises a first compensation inductor and a first compensation capacitor; one end of the first compensation inductor is connected to a first end of the output signal cable; another end of the first compensation inductor is connected to one end of the first compensation capacitor; and another end of the first compensation capacitor is grounded.

3. The radio frequency transmitter according to claim 2, wherein the first compensation inductor is an inductor with an adjustable or non-adjustable inductance value, or the first compensation capacitor is a capacitor with an adjustable or non-adjustable capacitance value.

4. The radio frequency transmitter according to claim 1, wherein the radio frequency transmitter comprises two current source sets; one end of the compensation circuit is connected to a second end of an output signal cable of one of the current source sets; and another end of the compensation circuit is connected to a second end of an output signal cable of the other current source set.

5. The radio frequency transmitter according to claim 4, wherein the compensation circuit comprises a second compensation inductor, a second compensation capacitor, and a third compensation inductor; and the second compensation inductor, the second compensation capacitor, and the third compensation inductor are sequentially connected in series.

6. The radio frequency transmitter according to claim 4, wherein the second compensation inductor is an inductor with an adjustable or non-adjustable inductance value, the second compensation capacitor is a capacitor with an adjustable or non-adjustable capacitance value, or the third compensation inductor is an inductor with an adjustable or non-adjustable inductance value.

7. The radio frequency transmitter according to claim 4, wherein the two current source sets are a positive-phase current source set and a negative-phase current source set, the positive-phase current source set comprises a plurality of positive-phase current source units, and the negative-phase current source set comprises a plurality of negative-phase current source units;

the plurality of positive-phase current source units is configured to output positive-phase unit output signals under control of corresponding control signals;

the plurality of negative-phase current source units is configured to output negative-phase unit output signals under control of corresponding control signals; and the matching network is configured to perform impedance matching on a set output signal of the positive-phase current source set and a set output signal of the negative-phase current source set.

8. The radio frequency transmitter according to claim 1, wherein in the current source set, the current source unit comprises a first drive tube and a second drive tube, and the first drive tube and the second drive tube form a cascade circuit;

the control signals comprise a digital sub-signal and a drive signal;

a gate of the first drive tube is configured to receive a digital sub-signal corresponding to the current source unit, and a drain of the first drive tube is configured to output a unit output signal of the current source unit; and a gate of the second drive tube is configured to receive a drive signal corresponding to the current source unit, and a source of the second drive tube is grounded.

9. The radio frequency transmitter according to claim 1, wherein the control circuit comprises an encoder, a radio frequency signal source, and a drive circuit, and the control signal comprises the digital sub-signal and the drive signal;

the encoder is configured to separately provide a plurality of digital sub-signals for the drive circuit and the current source set;

the radio frequency signal source is configured to provide a radio frequency input signal for the drive circuit; and the drive circuit is configured to generate a plurality of drive signals based on the radio frequency input signal and the plurality of digital sub-signals.

10. The radio frequency transmitter according to claim 9, wherein the encoder is configured to: receive an orthogonal baseband signal, and convert the orthogonal baseband signal into the plurality of digital sub-signals;

the radio frequency signal source is configured to generate an orthogonal radio frequency signal $CK_I$ and an orthogonal radio frequency signal $CK_Q$; and the drive circuit is configured to convert the plurality of digital sub-signals and the orthogonal radio frequency signals $CK_I$ and $CK_Q$ into the plurality of drive signals.

11. The radio frequency transmitter according to claim 9, wherein the encoder is configured to: receive a baseband amplitude signal, and convert the baseband amplitude signal into the plurality of digital sub-signals;

the radio frequency signal source is configured to generate a phase modulation signal; and the drive circuit is configured to convert the plurality of digital sub-signals and the phase modulation signal into the plurality of drive signals.

12. The radio frequency transmitter according to claim 1, wherein the radio frequency transmitter is an orthogonal transmitter;

the plurality of current source units in the current source set comprises a plurality of first current source units and a plurality of second current source units, and the plurality of first current source units is in a one-to-one correspondence with the plurality of second current source units; and a unit output signal of the first current source unit and a unit output signal of the second current source unit corresponding to the first current source are orthogonal signals to each other.

\* \* \* \* \*